United States Patent [19]

Chau et al.

[11] Patent Number: 5,550,906
[45] Date of Patent: Aug. 27, 1996

[54] TELECOMMUNICATIONS FEATURE SERVER

[75] Inventors: Toan Chau, Broomfield; Ronald E. Heffner, Boulder, both of Colo.

[73] Assignee: Lucent Technologies Inc., Murray Hill, N.J.

[21] Appl. No.: 286,839

[22] Filed: Aug. 5, 1994

[51] Int. Cl.$^6$ .............................. H04M 3/54; H04Q 11/04
[52] U.S. Cl. .................... 379/207; 379/201; 379/225; 379/229; 370/110.1; 370/60; 370/60.1; 370/58.1
[58] Field of Search .................... 379/201, 207, 379/225, 229; 370/60, 60.1, 58.2, 94.2, 62, 58.1, 110.1, 76, 62, 71, 73, 74, 583

[56] References Cited

U.S. PATENT DOCUMENTS

| | | | |
|---|---|---|---|
| 3,790,717 | 2/1974 | Abramson et al. | 179/15 AL |
| 4,313,036 | 1/1982 | Jabara et al. | 179/18 AD |
| 4,488,004 | 12/1984 | Bogart et al. | 179/18 AD |
| 4,535,448 | 8/1985 | Baxter et al. | 370/85 |
| 4,706,242 | 11/1987 | Harland | 370/60 |
| 4,710,917 | 12/1987 | Tompkins et al. | 370/62 |
| 4,720,850 | 1/1988 | Oberlander et al. | 379/90 |
| 4,763,317 | 8/1988 | Lehman et al. | 370/58 |
| 4,811,335 | 3/1989 | Van Baardwijk et al. | 370/63 |
| 4,878,240 | 10/1989 | Lin et al. | 379/67 |
| 4,893,307 | 1/1990 | McKay et al. | 370/94.1 |
| 4,903,261 | 2/1990 | Baran et al. | 370/94.2 |
| 5,051,982 | 9/1991 | Brown et al. | 370/58.2 |
| 5,093,827 | 3/1992 | Franklin et al. | 370/60.1 |
| 5,159,594 | 10/1992 | Bales et al. | 370/110.1 |
| 5,182,750 | 1/1993 | Bales et al. | 370/110.1 |
| 5,305,312 | 4/1994 | Fornek et al. | 370/62 |
| 5,319,640 | 6/1994 | Yamasaki et al. | 379/225 |
| 5,450,123 | 9/1995 | Smith | 348/17 |

OTHER PUBLICATIONS

H. Newton, *A Microsoft Fantasy*, Computer Telephony, 1994 Jan./Feb., pp. 9, 10, 12, 15, and 16.

*IEEE Spectrum*, (Jun. 1994), vol. 31, No. 6, FIG. 4, p. 53.

Primary Examiner—Jeffery Hofsass
Assistant Examiner—Parag Dharia
Attorney, Agent, or Firm—David Volejnicek

[57] ABSTRACT

A PBX (14) is employed as a feature server for another telecommunications subsystem (11), such as a broadband or a multi-media subsystem or another PBX. The PBX's feature set is thus made available to the other subsystem. Also, inter-PBX feature transparency is implemented thereby.

19 Claims, 18 Drawing Sheets 5,550,906

TELECOMMUNICATIONS FEATURE SERVER

TECHNICAL FIELD

This invention relates to telecommunications systems architecture.

BACKGROUND OF THE INVENTION

Traditionally, voice communications and data communications had been considered to be different kinds of communications, and hence have evolved along different paths. Voice communications systems, and particularly telephone systems, have evolved into very feature-rich systems that offer users a myriad of features such as call forwarding, hunt groups, coverage paths, pickup groups, bridging, etc. But voice communications systems have also evolved into connection-poor systems that generally assume all communications connections to be of a single type or, at best, of one of a very small set of very similar types. Conversely, data communications systems have evolved into feature-poor but connection-rich systems that offer users various transport mechanisms (e.g., circuit-switched, packet-switched, Asynchronous Transfer Mode, SONET, narrow-band, broadband, local-area network, wide-area network, etc.), media (e.g., facsimile transfers, electronic mail, file transfers, compressed and full-bandwidth video, etc.), and protocols (e.g., StarLAN, Ethernet, Internet, ARPANET, etc.), to name just a few.

In the recent past voice communications and data communications have been converging, so that now both kinds of communications are often provided by the same system. For example, ISDN telephony systems can carry either voice or data in their B channels, and some packet-switching systems handle both packetized voice and data. However, depending on whether the system is fundamentally a voice communications system or a data communications system, the services provided by the system to both the voice communications and the data communications have been either feature-poor and connection-rich, or feature-rich and connection-poor, respectively.

With the advent of multi-media communications and the integration of voice, data, and video communications that multi-media involves, the lack of either a full feature set or a full connection set has become unacceptable. Consequently, the industry is expending tremendous resources in designing new multi-media communications systems that are capable of providing both a variety of features and connections to multi-media communications. But the time and expense involved in the design of these new systems is great, and often prohibitive. Moreover, these systems are not usually compatible with the installed base of voice communications systems and data communications systems, and therefore require the replacement of the existing communications systems as opposed to providing a growth path for expanding the existing systems' capabilities to multi-media.

Hence, what the art requires is a relatively inexpensive and backward-compatible arrangement for providing multi-media services that offers both the feature richness of voice communications systems and the connection richness of data communications systems to all communications types of the multi-media environment.

SUMMARY OF THE INVENTION

The invention is directed to solving these and other problems and needs of the prior art. Illustratively, according to the invention, a feature-rich but connection-poor telecommunications controller, such as a telephone switching system, is employed as a telecommunications (e.g., telephony) feature server for a connection-rich but feature-poor telecommunications controller, such as a broadband or a multimedia node controller. Each of the telecommunications controllers provides connections for its corresponding endpoints, but the feature-rich telecommunications controller provides features for both controllers' endpoints. The two controllers cooperate to establish connections of a basic type (e.g., voice connections) between their corresponding endpoints.

Since the feature-rich (e.g., telephone) controller already provides the telecommunications features, there is no need to design the feature-poor (e.g., broadband) controller to also provide these features. Rather, the feature-rich (e.g., telephone) controller can provide the features to the feature-poor (e.g., broadband) controller in a client-server type of arrangement. Hence, the development time for the connection-rich but feature-poor (e.g., broadband) controller is shortened and its development cost is lessened without a sacrifice in the feature set that is made available to endpoints served by the connection-rich (e.g., telephone) controller. Furthermore, the provisioning of the rich set of features may be easily retrofitted into existing feature-poor (e.g., broadband) systems. Correspondingly, connection-rich (e.g., workstation) endpoints may be included in, and retrofitted into, connection-poor (e.g., telephone) systems. Hence, the benefits of both types of systems may be obtained simultaneously in a relatively short time and at a relatively low cost. Thus, for example, a broadband or a multi-media system having the versatility of a telephone system can be easily and inexpensively implemented. Furthermore, the endpoints of the broadband or multi-media system (e.g., workstations) and the endpoints of a telephone system (e.g., telephone sets) can communicate with each other, and can do so with the versatility of the telephone system.

According to a first aspect of the invention as claimed, a telecommunications system comprises a first telecommunications controller providing both basic and other telecommunications connections between a plurality of first telecommunications endpoints, and a second telecommunications controller connected to the first telecommunications controller, providing the basic but not the other telecommunications connections between a plurality of second telecommunications endpoints independently of the first telecommunications controller, and further providing telecommunications features to both (a) the plurality of first telecommunications endpoints through the first telecommunications controller and with respect to both the basic and the other telecommunications connections, and (b) the plurality of second telecommunications endpoints independently of the second telecommunications controller and with respect to the basic telecommunications connections. The first and the second telecommunications controllers cooperate to provide the basic telecommunications connections between the first telecommunications endpoints and the second telecommunications endpoints. Advantageously, the marriage of feature-rich but connection-poor systems and feature-poor but connection-rich systems is obtained thereby, resulting in a combined system that is both feature-rich and connection rich.

According to a second aspect of the invention as claimed, a telecommunications system comprises a telecommunications controller providing both voice and other telecommunications connections between a plurality of telecommunications endpoints, and a telephone switching system connected to the telecommunications controller, providing telephone connections but not the other telecommunications connections between a plurality of telephone sets independently of the telecommunications controller, and further providing telephony features to both (a) the telephone sets for the telephone connections independently of the telecommunications controller, and (b) the telecommunications endpoints for both the voice and the other telecommunications connections through the telecommunications controller. Advantageously, since a presumably-already-existing telephone switching system that is already equipped with the telephony features is used as a feature server for the connection-rich system, the time and cost of re-developing the same features for the connection-rich system is avoided. Moreover, the telephone switching system is used as a foundation on top of which the connection-rich system, such as a multi-media system, is built, without the necessity of replacing the telephone system.

According to a third aspect of the invention as claimed, a telecommunications system comprises a first and a second stored-program-controlled telephone switching system connected to each other and each including, and operating under control of, its own stored-program controller, wherein the first telephone switching system provides telecommunications connections independently of the second telephone switching system between a plurality of first telephone sets that are connected to the first telephone switching system, and further provides telecommunications features to the plurality of first telephone sets, wherein the second telephone switching system provides telecommunications connections independently of the first telephone switching system between a plurality of second telephone sets that are connected to the second telephone switching system, and further provides telecommunications features to the plurality of second telephone sets, and wherein the first and the second telephone switching systems cooperate to provide telecommunications connections between a first telephone set of the plurality of first telephone sets and a second telephone set of the plurality of second telephone sets, with the stored-program controller of one of the first and the second telephone switching systems acting as a telecommunications feature server for the stored-program controller of the other of the first and the second telephone switching systems to provide the telecommunications features for both the first telephone set and the second telephone set. In this manner, feature transparency is easily achieved between the two telephone switching systems. Feature transparency is the provisioning of service features in such a manner that a user can perceive no differences occasioned by the need to physically distribute telecommunication circuits or control. In other words, inter-switching-system calls appear to the user as if they were served by a single large switching system.

These and other advantages and features of the invention will become more apparent from the following description of an illustrative embodiment of the invention taken together with the drawing.

BRIEF DESCRIPTION OF THE DRAWING

FIGS. 3 and 7–8 are a flow diagram of functions performed by the control processes of FIG. 2 to establish a call originated by a workstation between the workstation and a telephone set in the system of FIG. 1;

FIGS. 14 and 5 are a flow diagram of functions performed by the control processes of FIG. 2 to add a workstation as a conferee to a call between workstations in the system of FIG. 1;

FIGS. 16 and 8 are a flow diagram of functions performed by the control processes of FIG. 2 to add a telephone set as a conferee either to a call between workstations or to a call between a workstation and a telephone set at the workstation's request in the system of FIG. 1;

DETAILED DESCRIPTION

Figure 1:
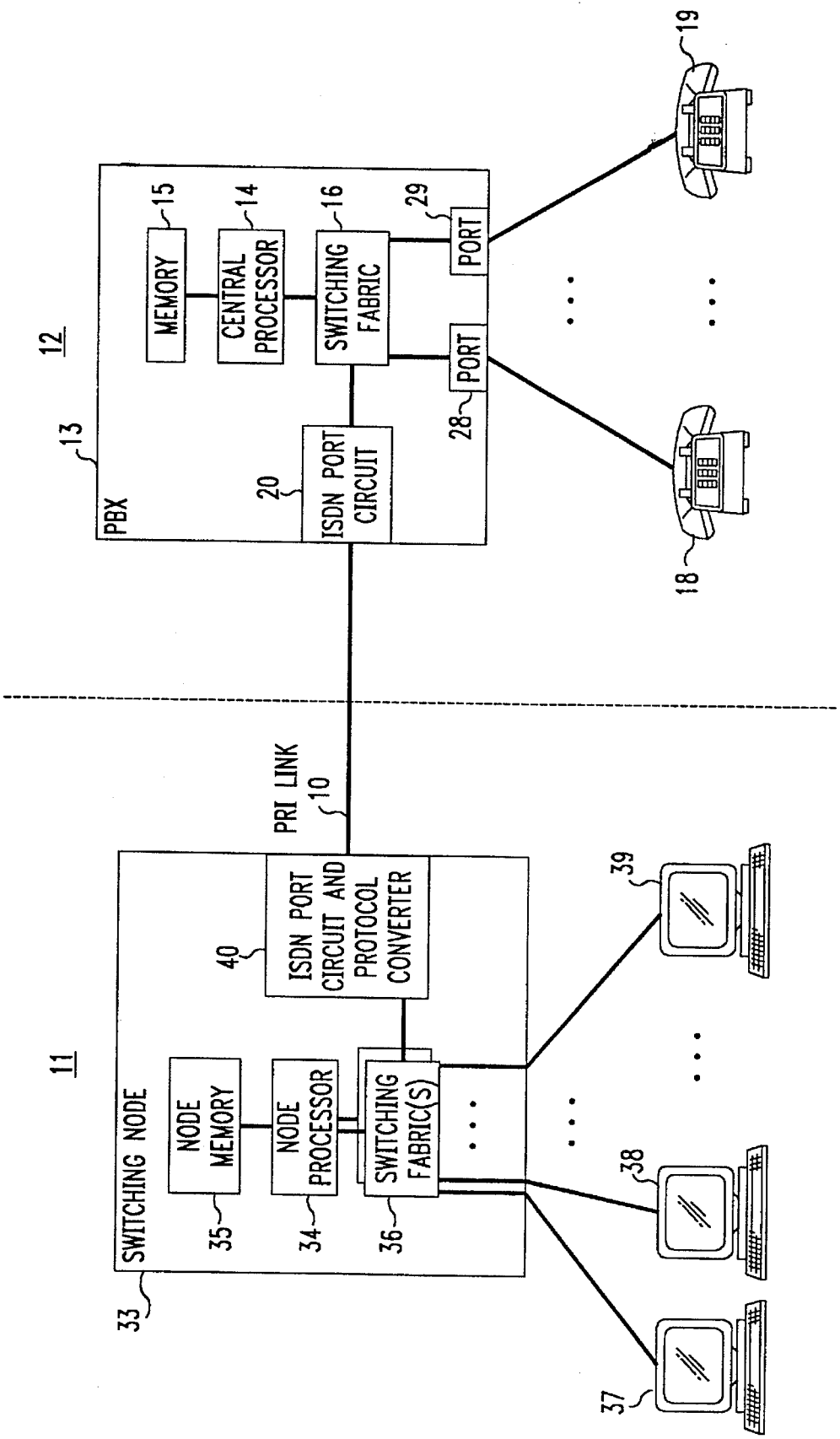
FIG. 1 is a block diagram of an illustrative telecommunications system that embodies an example of the invention.

FIG. 1 shows an illustrative telecommunications system that embodies an example of the invention. The system of FIG. 1 is made up of two communications subsystems 11 and 12 that are interconnected by a communications link 10. Only two subsystems are shown for simplicity; a plurality of subsystems 11 may be connected to (and served by, as discussed below) subsystem 12. Both subsystems 11 and 12 are substantially conventional. Subsystem 12 is a feature-rich subsystem, such as a telephony subsystem. Subsystem 12 illustratively comprises a telephony switching system, such as a private branch exchange (PBX) 13 that provides basic (e.g., telephony voice) communications services to a plurality of telephone sets 18–19. PBX 13 is a stored-program-controlled machine, such as an AT&T Definity® PBX. It includes a central processor 14 that executes control programs out of its memory 15 and controls a switching fabric 16 that provides basic communications connections between telephone sets 18–19 as well as other endpoints in a conventional manner.

Subsystem 11 may be substantially any desired communications arrangement. For example, it may be another telephony subsystem, like subsystem 12. Preferably, however, subsystem 11 is a connections-rich subsystem, such as a data or a multi-media communications subsystem. Subsystem 11 illustratively comprises a switching node 33, for example a local area network (LAN) server, a broadband multi-media switching hub, or an asynchronous transfer mode (ATM) packet switch, that provides data or multi-media communications services to a plurality of endpoints such as user workstations 37–39. Switching node 33 includes a node processor 34 that executes switching-node control programs out of node memory 35 and controls one or more switching fabrics 36 (e.g., LAN, crosspoint switch, etc.) that provide communications connections between workstations 37–39 as well as other endpoints. For purposes of this discussion, the principal function performed by node processor 34 is that of a name-server or router: it converts connection requests (received from workstations 37–39) that are expressed in terms of originating and terminating endpoint names and/or addresses into corresponding connections (with the aid of PBX 13, as will be made clear below).

Communications link 10 that interconnects subsystems 11 and 12 is illustratively an ISDN primary-rate interface (PRI) link that terminates at PBX 13 in a conventional ISDN port circuit 20. Though only one PRI link 10 is shown, a plurality may be used for greater inter-subsystem communications capacity. If switching node 33 uses the ISDN transmission protocol, PRI link 10 also terminates in just an ISDN port circuit 40 at switching node 33. If switching node 33 uses a different transmission protocol, PRI link 10 terminates at node 33 in an ISDN port circuit and protocol converter 40. ISDN port circuit and protocol converter 40 not only terminates the ISDN transmission protocol of PRI link 10 but converts between the ISDN transmission protocol and the internal transmission protocol of node 33, in a conventional manner.

PBX 13 provides voice connections and its conventional repertoire of telephony features to telephone sets 18–19 in a conventional manner, independently of subsystem 11. PBX 13 also provides the features to workstations 38–39 through switching node 33. Hence, PBX 13 acts as a feature server with respect to switching node 33, which in turn acts as a client of PBX 13, in a client-server type of arrangement. Switching node 33 provides its conventional repertoire of connections to workstations 37–39 in conjunction with the features provided by PBX 13. Specifically, switching node 33 provides the connections to workstations 37–39 that result from, and effect, the features being provided by PBX 13 to workstations 37–39. These may, and generally will, include connections other than, or more varied than, those provided by PBX 13 to telephone sets 18–19, such as image, video, and data connections. Additionally, switching node 33 may provide features to workstations 37–39 out of its feature repertoire that are additional to those provided by PBX 13 (e.g., video broadcasting and video-on-demand). Connections and features that are provided by switching node 33 to workstations 37–39 and that are beyond those provided by PBX 13 are referred to herein (from the telephony perspective) as enhanced services. Under the direction of PBX 13, PBX 13 and switching node 33 cooperate to provide telephony (voice communications) connections between telephone sets 18–19 and workstations 37–39.

Figure 2:
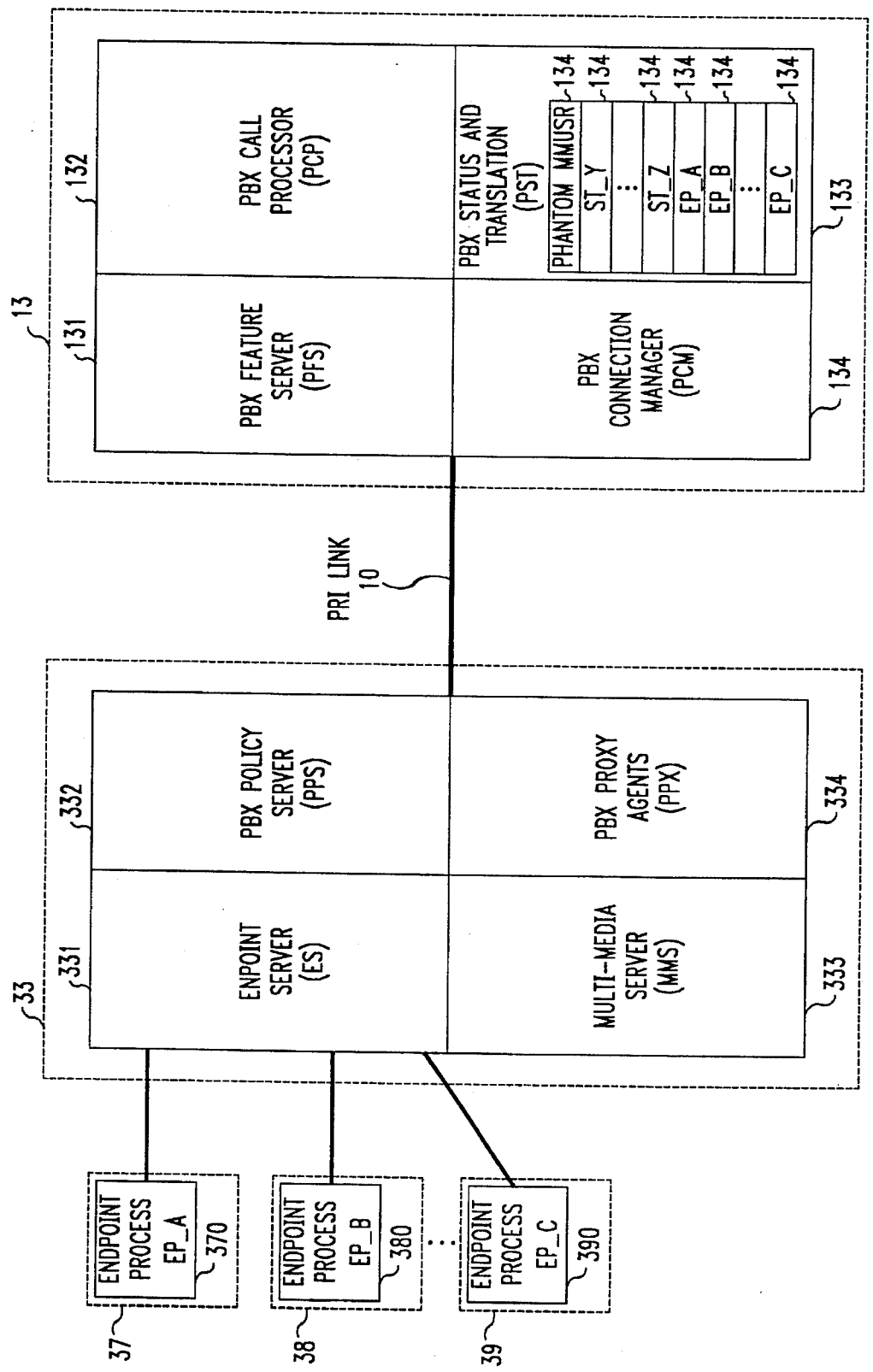
FIG. 2 is a block diagram of relevant control processes and data structures of the system of FIG. 1.

FIG. 2 illustrates the configuration of control processes and data structures in the system of FIG. 1 that are relevant to this discussion. These control processes and data structures exist at the application layer (layer 7) of the ISO's OSI model of software architecture. Control processes and data structures that exist at the lower levels and that support the application layer processes are not important hereto and are of conventional design; hence, they are not shown. The control processes and data structures or PBX 13 are stored in memory 15, and central processor 14 executes the control processes out of memory 15 and makes use of the data structures in memory 15 during execution. Similarly, the control processes of switching node 33 are stored in node memory 35 from where they are executed by node processor 34, and control processes or workstations 37–39 are stored in workstation memories and are executed therefrom by workstation processors.

As indicated in FIG. 2, PBX 13 includes a conventional PBX status and translations database (PST) 133 that stores information about each endpoint (EP) (e.g., telephone set 18–19) served by PBX 13. Each endpoint's one or more corresponding entries 134 in PST 133 contain information that includes the extension number that is assigned to the endpoint, the name of the user who is associated with the endpoint, the permissions for the endpoint, the features that are assigned to and activated for the endpoint, and the present status of that endpoint (e.g., idle, busy). For each endpoint that is connected directly to PBX 13 (i.e., each telephone set 18–19), the information also includes the identifying number of the PBX port 28–29 (see FIG. 1) to which the endpoint is connected. Because PBX 13 is also required in the system of FIG. 1, to provide services to other endpoints (i.e., workstations 37–39), PST 133 must contain information entries 134 for these endpoints as well. However, because these endpoints are not connected directly to PBX 13, their entries 134 in PST 133 differ from the entries 134 for telephone sets 18–19 in that they do not include a port identifier. Administration of information for a (generally physically non-existent, or virtual) endpoint without including an associated port identifier is commonly referred to as "administration without hardware", which is a conventional capability provided on the AT&T Definity PBX. PST 133 also includes call records for all presently-existing calls.

PBX 13 control processes include conventional PBX call processing (PCP) 132, which implements features on PBX 13. With respect to endpoints, such as telephone sets 18–19, which are administered in PST 133 with a corresponding port number, PCP 132 calls upon a conventional PBX connection manager (PCM) 134 to set up or tear down any connections that PCP 132 specifies. With respect to endpoints, such as workstations 38–39, that are administered without hardware. PCP 132 calls upon another pre-specified entity. In this case, the entity is a control process referred to as a PBX feature server (PFS) 131.

PFS 131 provides external access to features which PBX 13 conventionally provides only to endpoints—telephone sets 18–19—that are directly connected to and directly served by PBX 13. PCP 132 acts as an interface between PFS 131 and ISDN port circuit 20, conveying signaling information that is received by ISDN port circuit 20 over the signaling channel (D channel) of PRI link 10 to PFS 131, and conveying control information generated by PFS 131 with respect to workstations 37–39 to ISDN port circuit 20 for transmission over the control channel of PRI link 10. PFS 131 terminates a PRI temporary signaling connection (CCITT Q.932 signaling) via PCP 132, and performs actions based on the CCITT Q.932 messaging protocol that is carried by Q.931 signaling on the signaling channel. PFS 131 makes the existence of subsystem 11 transparent to PBX 13: as far as PBX 13 is aware, it merely has a conventional ISDN trunk connection (PRI link 10) to the external world, and it is conventionally administered with a plurality of seemingly-virtual endpoints (workstations 37–39).

Control processes of switching node 33 include a PBX policy server (PPS) 332 whose function is to provide access for workstations 37–39 to PBX 13 features by means of communicating with PFS 131 via PRI link 10, an endpoint server (ES) 331 whose function is to provide call-request handling between workstations 37–39, and a multi-media server (MMS) 333 whose function is to provide and manage various types or media of connections (e.g., audio, video, image) between workstations 37–39 and other endpoints as requested. PPS 332 is subsystem 11's counterpart to PFS 131, ES 331 is the counterpart to PCP 132, and MMS 333 is the counterpart to PCM 134. The control processes of switching node 33 further include a PBX proxy agent (PPX) 334 which functions as a connection server to PRI link 10 to facilitate calls between workstations 37–39 and telephone sets 18–19. A separate instance of PPX 334 is created for each telephone set 18–19 that is presently involved in a call between workstations 37–39 and telephone sets 18–19. To the extent that instances of PPX 334 represent telephone sets 18–19 in subsystem 11, the instances of PPX 334 may be thought of as counterparts to virtual endpoints on PBX 13.

Control processes of workstations 37–39 are referred to herein as endpoint processes (EPs) 370–390, a corresponding one per workstation 37–39. Their function is to communicate with ES 331 and PPS 332 to obtain requested services (e.g., communications connections) for their corresponding workstations 37–39.

While PRI link 10 is a conventional ISDN link utilizing the conventional ISDN transmission protocol, two message sets are carried by this transmission medium: the standard ISDN message set used for messages exchanged between PPX 334 and PCP 132, and an FSA message set used for messages exchanged between PPS 332 and PFS 131. The FSA is a Q. 932 Remote Operation Service Element (ROSE)-based protocol which is carried by Q. 931 USERINFO messages across PRI link 10. The FSA message set includes transaction-origination (MAKE_CALL), transaction-progress acknowledgment (OPERATION_PROCEED), originating party class-of-restriction/class-of-service validation (ORIG_PARTY), call destination (TERM_PARTY), disconnect (CLEAR_CALL), event notification of various events such as call-progress events, e.g., connect, busy, out-of-service, etc. (EVENT_NOTIFICATION), ongoing-transaction requests (ADD_PARTY_TO_CALL and DROP_PARTY_FROM_CALL), and transaction-completion indication (RETURN_RESULT or RETURN_ERROR) messages. For handling conference calls, the FSA message set also includes ADD_PARTY and DROP_PARTY messages.

The following call scenarios illustrate the requirements for the abovementioned control processes, and the manner in which PBX 13 provides features therethrough for workstations 37–39 of subsystem 11.

Figure 3:
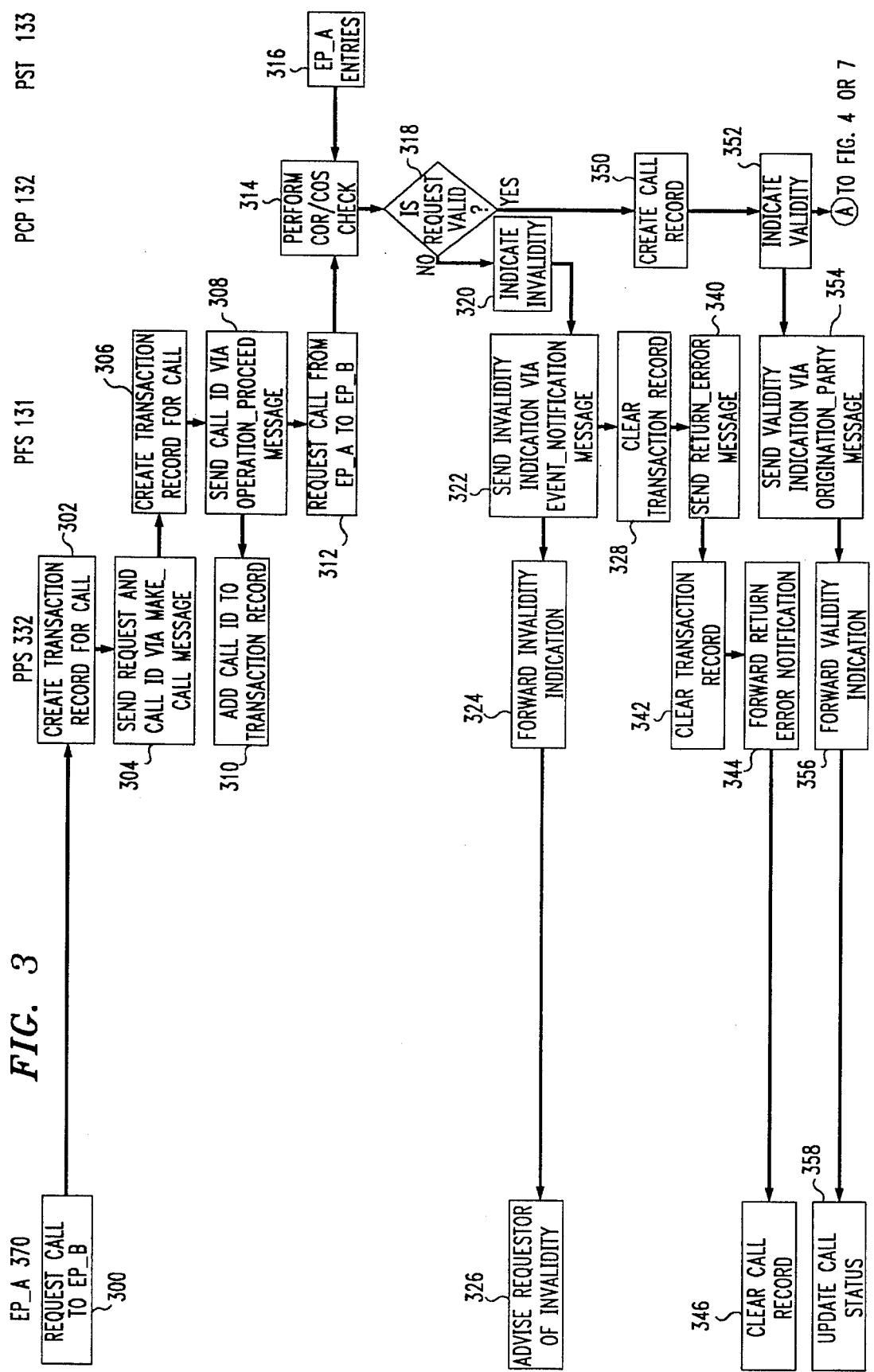
FIGS. 3–5 are a flow diagram of functions performed by the control processes of FIG. 2 to establish a call between workstations in the system of FIG. 1.
Figure 4:
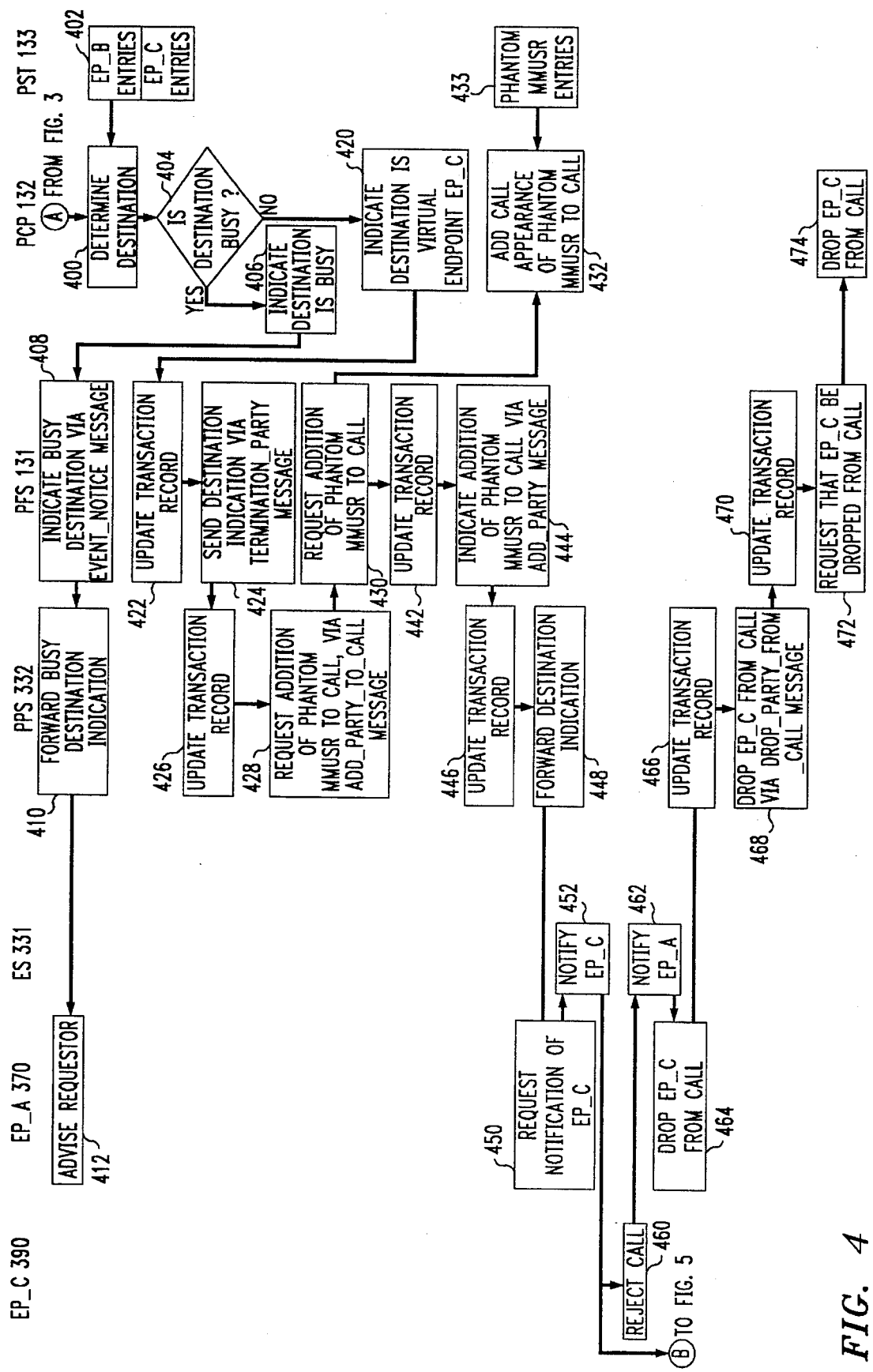
Figure 5:
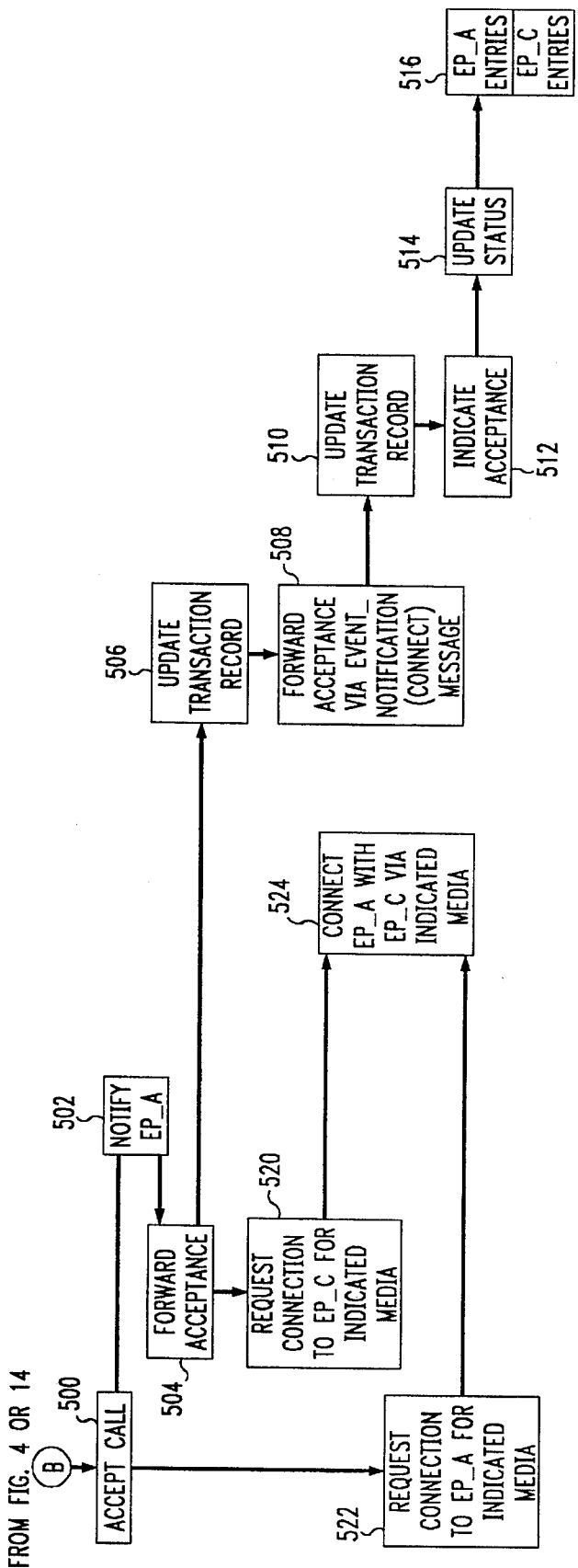

FIGS. 3–5 illustrate a scenario for call-establishment between two of the workstations 37–39. A workstation 37 initiates the call, for example in response to a request from a user of workstation 37, by means of its EP_A 370 sending a request for a call to workstation 38 (EP_B) to PPS 332, at step 300. In the request, EP A 370 identifies the desired call destination (workstation 38) in some way, such as by name, address, or extension number. PPS 332 receives the request and creates a transaction record for the call, at step 302. Transaction records kept by PPS 332 and PFS 131 for each inter-subsystem call tie together the knowledge of the calls between PPS 332 and PFS 131. The transaction record identifies the originating endpoint and address digits, and includes a call identifier that PPS 332 assigns to this call. PPS 332 then sends the request and the call identifier to PFS 131 across PRI link 10 via a MAKE_CALL message, at step 304. PFS 131 receives the MAKE_CALL message and creates a transaction record for the call, at step 306. The transaction record identifies the originating endpoint and address digits, and includes both the call identifier assigned by PPS 332 as well as a call identifier that PFS 331 assigns to this call. PFS 331 then sends this latter call identifier to PPS 332 across PRI link 10 via an OPERATION_PROCEED message, at step 308. PPS 332 receives the OPERATION_PROCEED message and enters the call identifier assigned by PFS 331 in its own transaction record for the call, at step 310. PPS 332 and PFS 331 can now exchange communications about the call with each other by identifying the call in the message by the message recipient's own call identifier.

Following step 308, PFS 131 makes a request to PCP 132, via internal signaling of PBX 13, for a call from workstation 37 to the address digits, at step 312. PCP 132 receives the request and performs a conventional class-of-restriction/class-of-service (COR/COS) check on the request, at step 314, by examining entries 134 for workstation 37 (EP_A) in PST 133, as indicated at step 316. This is the first service feature that PBX 13 provides for subsystem 11. Depending on the results of the COR/COS check, as indicated at step 318, PCP 132 indicates either invalidity or validity of the call request to PFS 131, at step 320 or 350, respectively.

If the indication is one of invalidity, at step 320, PFS 131 sends the invalidity indication across PRI link 10 via an EVENT_NOTIFICATION message, at step 322. PPS 332 receives the message and forwards the invalidity indication to EP_A 370, at step 324. EP_A 370 then notifies the requestor at workstation 37 of the invalidity of the request, at step 326.

Following step 322, PFS 131 clears its transaction record for this call, at step 328, and sends a RETURN_ERROR message across PRI link 10 to PPS 332, at step 340. PPS 332 receives the message and in turn clears its transaction record for this call, at step 342. PPS 332 then fop, yards a return-error notification to EP_A 370, at step 344. EP_A 370 receives the notification and clears its call record for this call, at step 346. The call thus comes to an unsuccessful end.

Returning to step 318, if the COR/COS check passed, PCP 132 creates a call record for the call, at step 350, and sends a validity indication to PFS 131, at step 352. PFS 131 receives the validity indication and sends it across PRI link 10 via an ORIGINATION_PARTY message, at step 354. PPS 332 receives the message and forwards the validity indication to EP_A 370, at step 356. EP_A 370 receives the indication and updates its call status for the call therewith, at step 358.

After indicating request validity at step 352, PCP 132 determines the destination of the call to be workstation 38, at step 400 of FIG. 4, by applying the address digits to the contents of PST 133. This is the second service feature that PBX 13 provides for subsystem 11. Assume, for example, that entries 134 in PST 133 for workstation 38 indicate that workstation 38 subscribes to a call-forwarding feature which is activated and which designates workstation 39 as the forwarding endpoint. By examining entries 134 for workstation 38 (EP_B), at step 402, PCP 132 makes this determination, and in turn examines entries 134 for workstation 39 (EP_C) to determine if they further affect the call destination, also at step 402. Assume that entries 134 for EP_C do not affect the call destination further. PCP 132 therefore determines at step 400 from contents of PST 133 that the call destination is workstation 39 (EP_C), and further determines from those contents that EP_C is a virtual endpoint. It also determines from those contents whether or not the endpoint is busy, at step 404. If EP_C is busy (and its entries do not specify a coverage point that can be substituted as the destination for the call), PCP 132 notifies PFS 131 that the endpoint is busy and therefore cannot be reached, at step 406. PFS 131 receives the busy indication and sends it across PRI link 10 via an EVENT_NOTIFICATION message, at step 408. PPS 332 receives the message and forwards the busy notification on to EP_A 370, at step 410. EP_A 370 advises the requestor of the destination's busy state, at step 412. It is now up to the requestor or to EP_A 370 to decide what to do next. Typically, EP_A 370 requests that the call be cleared, at which point the scenario follows steps 622 et seq. of FIG. 6, discussed below.

If PCP 132 finds the endpoint EP_C to not be busy at step 404, it notifies PFS 131 that the destination is the virtual endpoint EP_C, at step 420. PFS 131 receives the destination indication and updates its transaction record for the call accordingly, at step 422. PFS 131 also sends the destination indication across PRI link 10 via a TERMINATION_PARTY message, at step 424. PPS 332 receives the message and updates its transaction record for the call accordingly, at step 426. PPS 332 then requests the addition of a phantom endpoint, referred to as phantom MMUSR, to the call, by sending an ADD_PARTY_TO_CALL message to PFS 331, at step 428. The phantom endpoint MMUSR is administered in PST 133 of PBX 13 as a virtual endpoint with many call appearances. It is used to enable single-party calls to exist on PBX 13, as will be made clear further below. PFS 131 receives the message and requests PCP 132 to add phantom MMUSR to the call, at step 430. PCP 132 responds by adding a call appearance of phantom MMUSR to the call, at step 432, modifying entries 134 for phantom MMUSR in PST 133 in the process, as indicated at step 433. PFS 131 then updates its transaction record accordingly, at step 442, and indicates to PPS 332 that phantom MMUSR has been added to the call, by sending an ADD_PARTY message across PRI link 10, at step 444. PPS 332 receives the message and updates its transaction record accordingly, at step 446. PPS 332 also forwards the indication, received at step 426, that workstation 39 (EP_C) is the destination of the call, to EP_A 370, at step 448. EP_A 370 receives the destination indication and requests ES 331 to notify EP_C 390 and offer it a call from EP_A 370 in a particular medium, at step 450. ES 331 notifies EP_C 390, at step 452. The notice indicates the medium or media in which the call is to be conducted.

EP_C 390 can either accept or reject the call. If it rejects the call, it so notifies ES 331, at step 460. ES 331 in turn notifies EP_A 370, at step 462. It is now up to EP_A 370 to decide how to proceed. Normally, however, EP_A 370 responds by requesting PPS 332 to drop the call destination (EP_C) from the call, at step 464. PPS 332 receives the request and updates its transaction record accordingly, at step 466. PPS 332 also sends a DROP_PARTY_FROM_CALL message across PRI link 10 requesting that EP_C be dropped from the call, at step 468. PFS 131 receives the message and updates its transaction record accordingly, at step 470. PFS 131 also requests PCP 132 to drop EP_C from the call, at step 472. PCP 132 does so, at step 474. It is now up to the user of workstation 37 or to EP_A 370 to decide what to do next. Choices include selecting another destination for the call (a repeat of the scenario of FIG. 3), or clearing the call (see steps 622 et seq. of FIG. 6).

If, after being offered the call at step 452, EP_C 390 decides to accept the call, it so notifies ES 331, at step 500 of FIG. 5. EP_C 390 also sends a request to MMS 333 to establish a unidirectional connection from workstation 39 to workstation 37 in whatever medium or media were indicated for the call, at step 522. Meanwhile, ES 331 receives the indication of call acceptance from EP_C 390 and forwards it to EP_A 370, at step 502. EP_A 370 receives the acceptance indication and forwards it to PPS 332, at step 504. EP_A 370 also sends a request to MMS 333 to establish a unidirectional connection from workstation 37 to workstation 39 (EP_C 390) in whatever medium or media its original call request encompassed, at step 520. MMS 333 receives the connection requests from EP_A 370 and EP_C 390 and establishes the requested unidirectional connections between workstations 37 and 39, at step 524. Providing the connections in one or more of a plurality of selectable media is an enhanced service provided by subsystem 11 to workstations 37–39. Workstations 37 and 39 are now participants in a bidirectional, and possibly a multi-media, call.

Returning to step 504, PPS 332 receives the acceptance indication that was forwarded by EP_A 370, and updates its transaction record accordingly, at step 506. PPS 332 also forwards the acceptance indication to PFS 131 via an EVENT_NOTIFICATION (CONNECT) message, at step 508. PFS 131 receives the message and updates its transaction record accordingly, at step 510. PFS 131 also indicates the acceptance to PCP 132, at step 512. PCP 132 receives the acceptance indication and updates the status of workstations 37 and 39 accordingly, at step 514, by making appropriate changes to the contents of entries 134 in PST 133 for EP_A and EP_C, as indicated at step 516. PBX 13 now has a standard call record for the call between EP_A, EP_C, and phantom MMUSR. This is another service that PBX 13 provides for subsystem 11: it keeps track of the present status of workstations 37–39, including the status of any calls that they are participating in.

Figure 6:
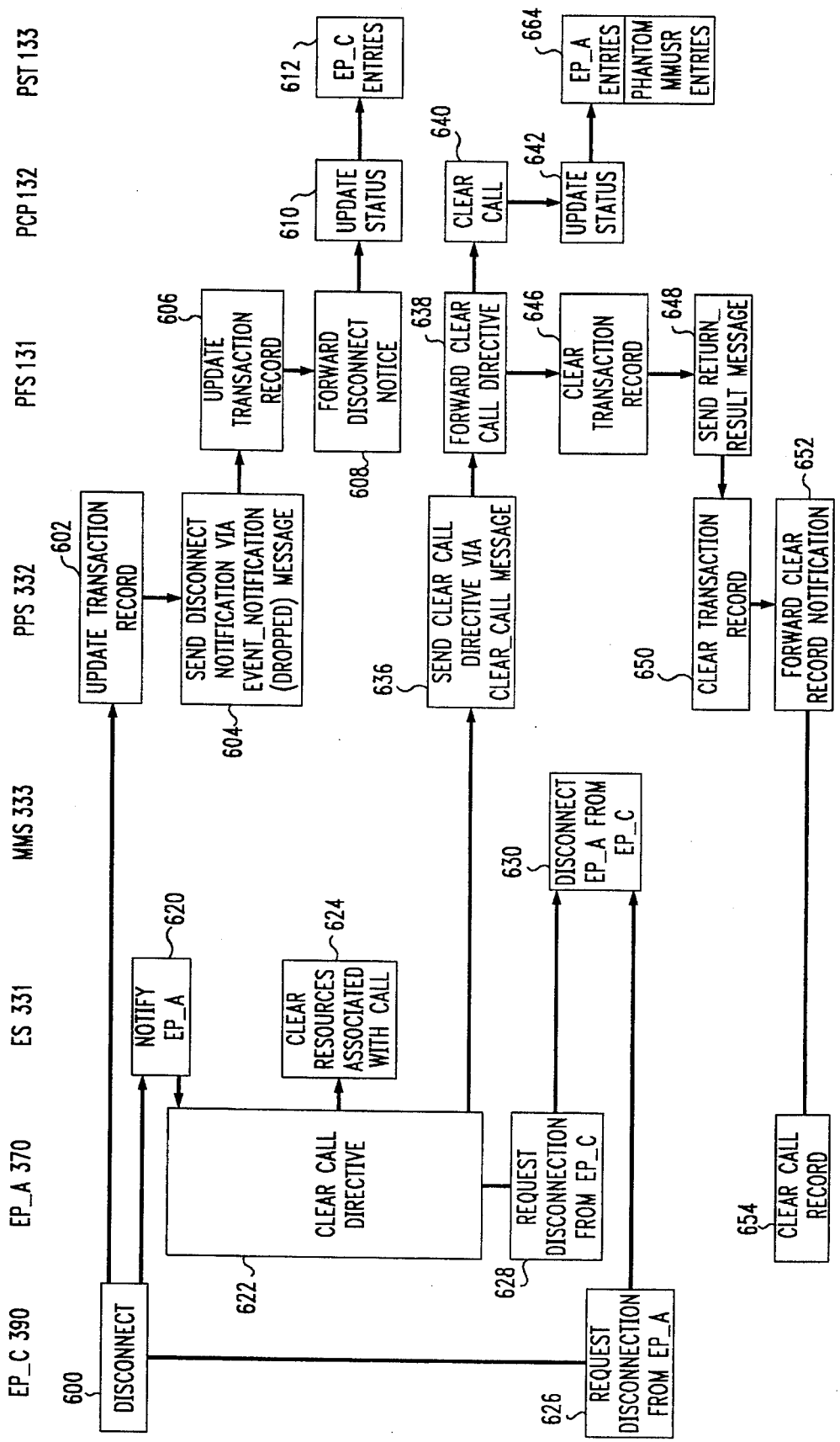
FIG. 6 is a flow diagram of functions performed by the control processes of FIG. 2 to terminate the call of FIGS. 3–5.

FIG. 6 illustrates the scenario for termination of the call between workstations 37 and 39 whose establishment was illustrated in FIGS. 3–5. Assume that workstation 39 (EP_C 390) is the first to disconnect from the call. EP_C 390 notifies both ES 331 and PPS 332 of the disconnection, at step 600, and requests MMS 333 to disconnect it from EP_A, at step 626. PPS 332 updates its transaction record accordingly, at step 602. PPS 332 also sends the disconnect indication to PFS 131 via an EVENT_NOTIFICATION (DROPPED) message, at step 604. PFS 131 also forwards the disconnect notice to PCP 132, at step 608. In response, PCP 132 updates the status of EP_C, at step 610, by modifying its entries 134 in PST 133, as indicated at step 612. Even though the call is now only a single-party call, because of the involvement of phantom terminal MMUSR in the call, PBX 13 continues to see the call as (at least) a two-party call, and hence it maintains the call.

Returning to step 600, when ES 331 receives the notification of disconnection from EP_C 390, it in turn notifies EP_A 370, at step 620. EP_A 370 normally responds with a clear-call directive, at step 622, which it sends to ES 331 and PPS 332. EP_A 370 also requests MMS 333 to disconnect it from EP_C, at step 628. MMS 333 responds to the disconnect requests from EP_C 390 and EP_A 370 by disconnecting EP_A and EP_C as requested, at step 630.

When ES 331 receives the clear-call directive given at step 622, it responds by clearing any resources which it is managing that were implicated in the call, at step 624. When PPS 332 receives the clear-call directive, it forwards the directive to PFS 131 via a CLEAR_CALL message, at step 636. PFS 131 responds by forwarding the clear-call directive to PCP 132, at step 638. PCP 132 views the clear-call directive as EP_A dropping from the call, which leaves only the single, phantom, party MMUSR on the call. PCP 132 therefore clears the call in a conventional manner, at step 640, and updates the status of endpoints that were involved in the call accordingly, at step 642. This involves updates to entries 134 of EP_A and phantom MMUSR in PST 133, as indicated at step 644.

Further in response to the clear-call directive, PFS 131 clears its transaction record for the call, at step 646, and notifies PPS 331 via a RETURN_RESULT message, at step 648. PPS 332 receives the message and clears its transaction record for the call, at step 650. PPS 332 also forwards notification thereof to EP_A 370, at step 652. EP_A 370 receives the notification and in turn clears its call record for the call, at step 654.

Figure 7:
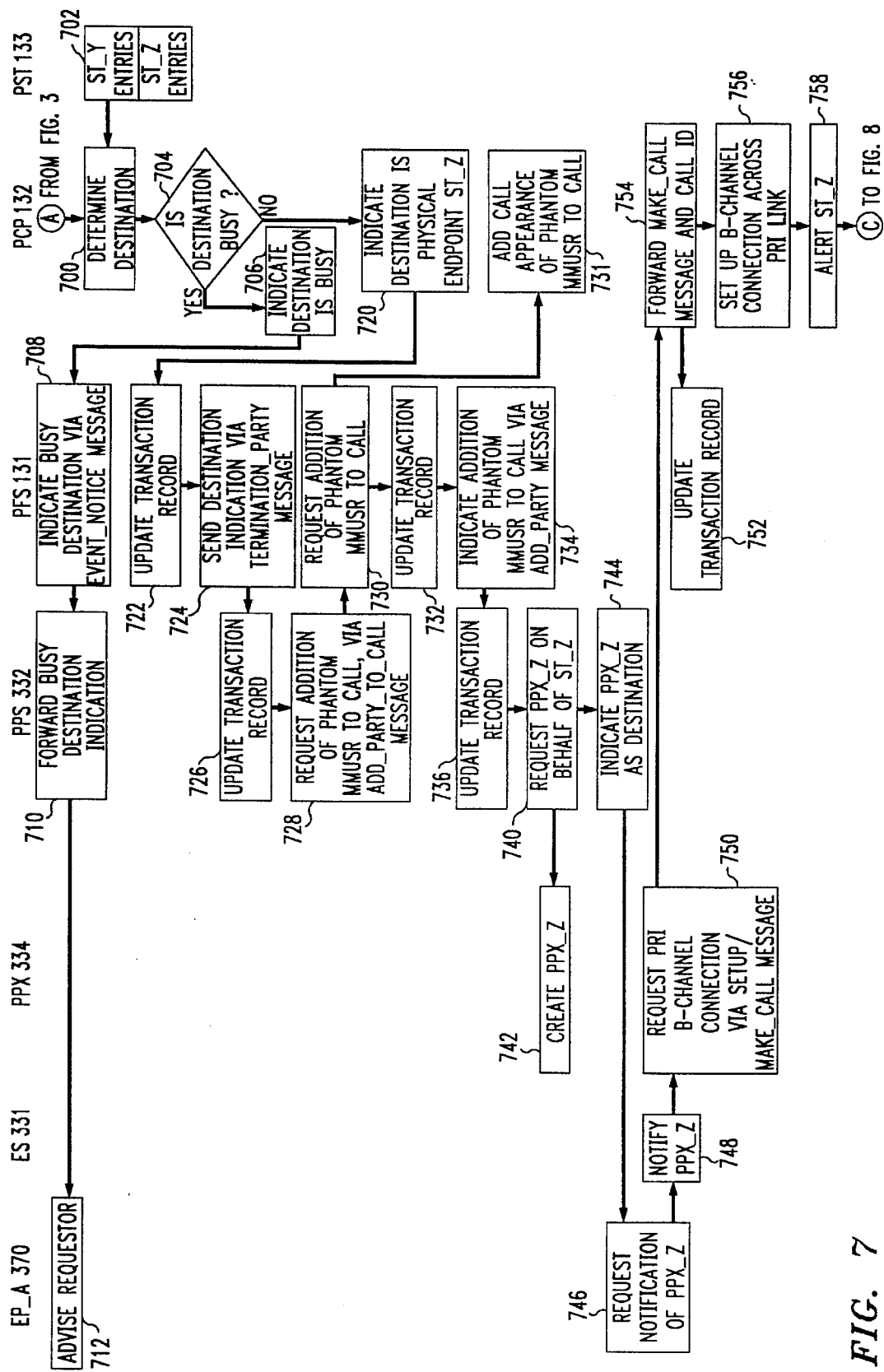
Figure 8:
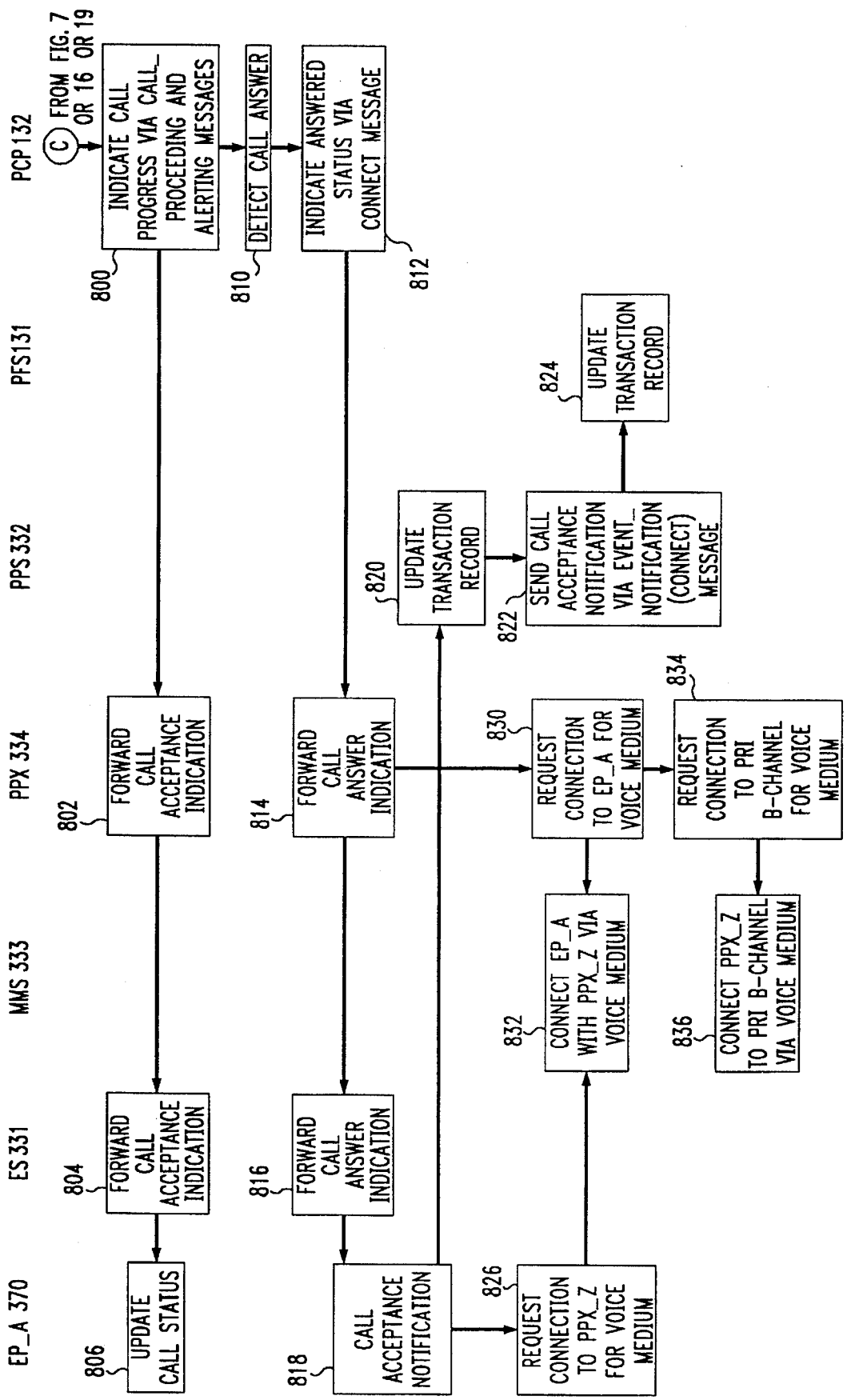

FIGS. 3 and 7–8 illustrate a scenario for call establishment between one of the workstations 37–39 and one of the telephone sets 18–19, wherein the call is originated by the workstation. Assuming that workstation 37 originates a call to telephone set 18 (ST_Y), references to ST_Y replace references to EP_B in FIG. 3. If, for example, telephone set 18 subscribes to a send-all-calls feature which is activated and which designates workstation 39 (EP_C) as the covering endpoint, the scenario would correspond to that shown in FIGS. 3–5 discussed above. However, assume instead that telephone set 18 subscribes to the send-all-calls feature which is activated and which designates telephone set 19 (ST_Z) as the covering endpoint.

Continuing with this latter scenario, PCP 132 determines, at step 700 of FIG. 7, from contents of entries 134 of ST_Y and ST_Z of PST 133, as indicated at step 702, that the call destination is the physical (as opposed to virtual) telephone set 19 (ST_Z). PCP 132 also determines from those entries 134 whether the destination is busy, at step 704. If ST_Z is busy, PCP 132 initiates the scenario of steps 706–712 which re-creates the scenario of steps 406–412, respectively, of FIG. 4. If ST_Z is not busy, PCP 132 notifies PFS 131 of the destination, at step 720. In response, PCP 132 and PFS 131 initiate the scenario of steps 722–736 which recreates the scenario of steps 422–446, respectively, of FIG. 4. In response to the destination information that it received at step 726, PPS 332 requests PPX 334 to create an instance of itself, called PPX_Z, on behalf of telephone set 19 (ST_Z), at step 740. PPX 334 responds by creating a new instance of itself named PPX_Z, at step 742. PPS 332 then provides an identifier, e.g., the name, of PPX_Z, to EP_A 370 as the destination of the call at step 744. EP_A 370 receives the destination identifier and responds by requesting that PPX_Z be notified and requested to participate in the call, at step 746. ES 331 receives the request and notifies PPX_Z, at step 748. PPX_Z receives the notification and makes a request for a bidirectional PRI B-channel connection across PRI link 10 by sending a SETUP message carrying a MAKE_CALL message across PRI link 10 to PCP 132, at step 750. The MAKE_CALL message carries the call identifier that had been assigned to this call by PPS 332 at step 302 of FIG. 3. PCP 132 receives the SETUP message and forwards the MAKE_CALL message contained therein, along with the call identifier that PCP 132 uses for this call, to PFS 131, at step 754. PFS 131 updates its transaction record accordingly by entering both of the received call identifiers in the call's transaction record, at step 752.

In response to the SETUP message that it received at step 754, PCP 132 sets up the requested B-channel connection across PRI link 10, at step 756, in a conventional manner. PCP 132 then alerts telephone set 19 (ST_Z), e.g., by ringing telephone set 19, at step 758. PCP 132 indicates receipt and progress of the call by sending a CALL_PROCEEDING message across PRI link 10 to PPX_Z, and sends the alerting status of telephone set 19 (ST_Z) across PRI link 10 via an ALERTING message, both at step 800 of FIG. 8. PPX_Z receives the CALL_PROCEEDING and ALERTING messages and forwards an indication of call acceptance and alerting to ES 331, at step 802. ES 331 in turn forwards the call-acceptance and alerting indications to EP_A 370, at step 804. EP_A 370 receives the indications and updates its call status accordingly, at step 806.

It is up to workstation 37 to decide how long to wait for telephone set 19 to be answered. If telephone set 19 is not answered within an acceptable period of time, workstation 37 usually clears the call. This portion of the scenario is illustrated in steps 912 et seq. of FIG. 9. If, however, telephone station 19 (ST_Z) answers the call promptly, PCP 132 detects the answer in the conventional manner, at step 810, and indicates the answered status of the call to PPX_Z via a CONNECT message that it sends across PRI link 10, at step 812. In response, PPX_Z requests ES 331 to notify EP_A 370 of the call-answered status, at step 814, and also requests MMS 333 to establish a unidirectional connection from PPX_Z to EP_A 370 for a voice medium, at step 830, and to establish a bidirectional voice connection from PPX_Z to the PRI B-channel, at step 834. ES 331 notifies EP_A 370 of the call-answered status, at step 816. In response, EP_A 370 sends a call-acceptance notification to PPS 332, at step 818. PPS 332 receives the acceptance notification and updates its transaction record accordingly, at step 820. PPS 332 also sends the acceptance notification to PFS 131 via an EVENT_NOTIFICATION (CONNECT) message across PRI link 10, at step 822. PFS 131 receives the message and updates its transaction record accordingly, at step 824.

Having given the call acceptance notification at step 818, EP_A 370 also requests MMS 333 to establish a unidirectional connection to PPX_Z for a voice medium, at step 826. In response to the connection requests received from EP_A 370 and PPX_Z, MMS 333 establishes voice connections between EP_A 370 and PPX_Z, at step 832, and establishes a voice connection between PPX_Z and the PRI B-channel, at step 836. PPX 334 has associated with itself one or more physical locations in a voice-medium switching fabric of switching fabrics 36, and MMS 333 makes the connections on behalf of PPX_Z to one of these physical locations. Workstation 37 and telephone set 19 are now participating in a voice call.

Figure 9:
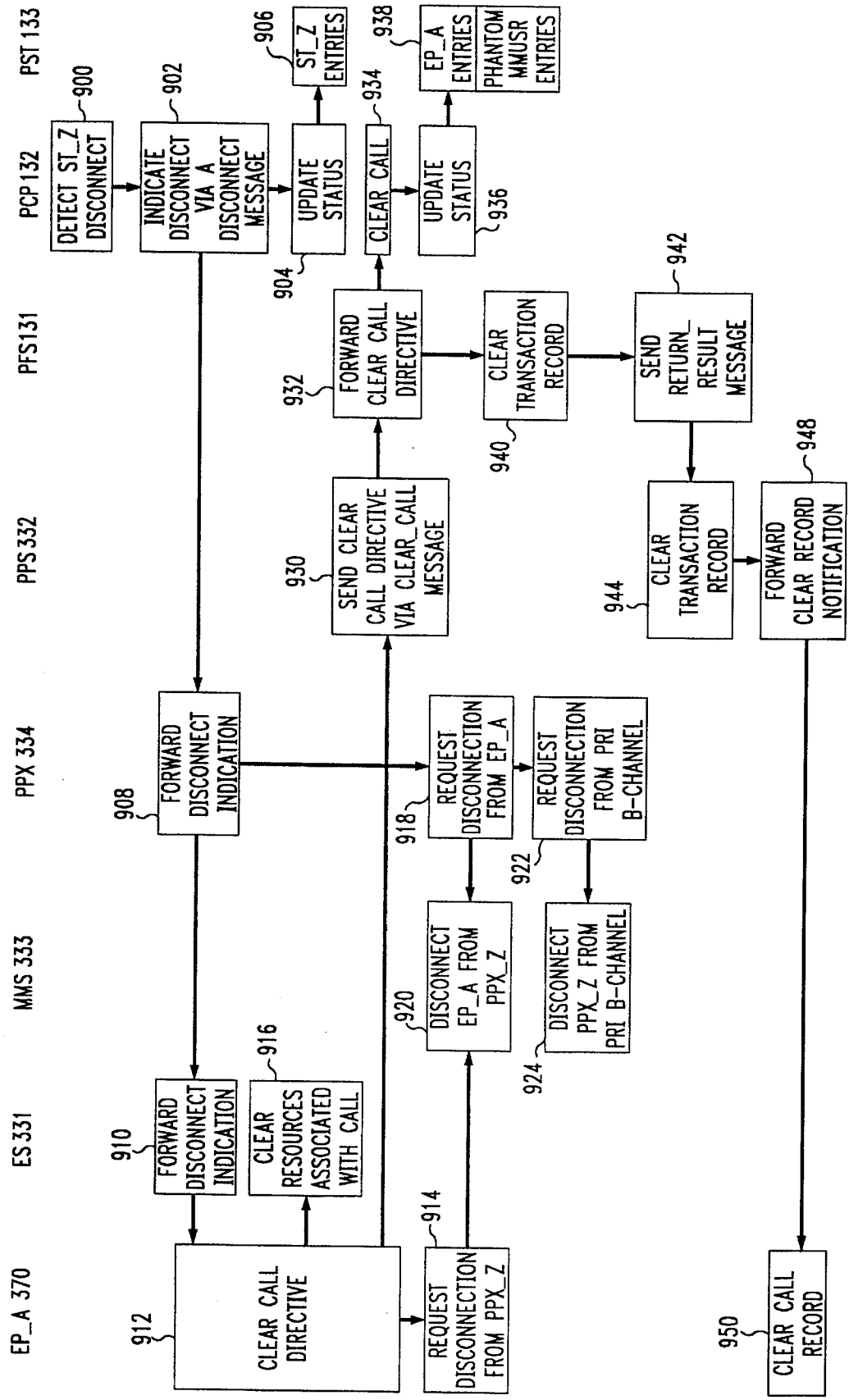
FIG. 9 is a flow diagram of functions performed by the control processes of FIG. 2 to terminate the call of FIGS. 3 and 7–8.
Figure 13:
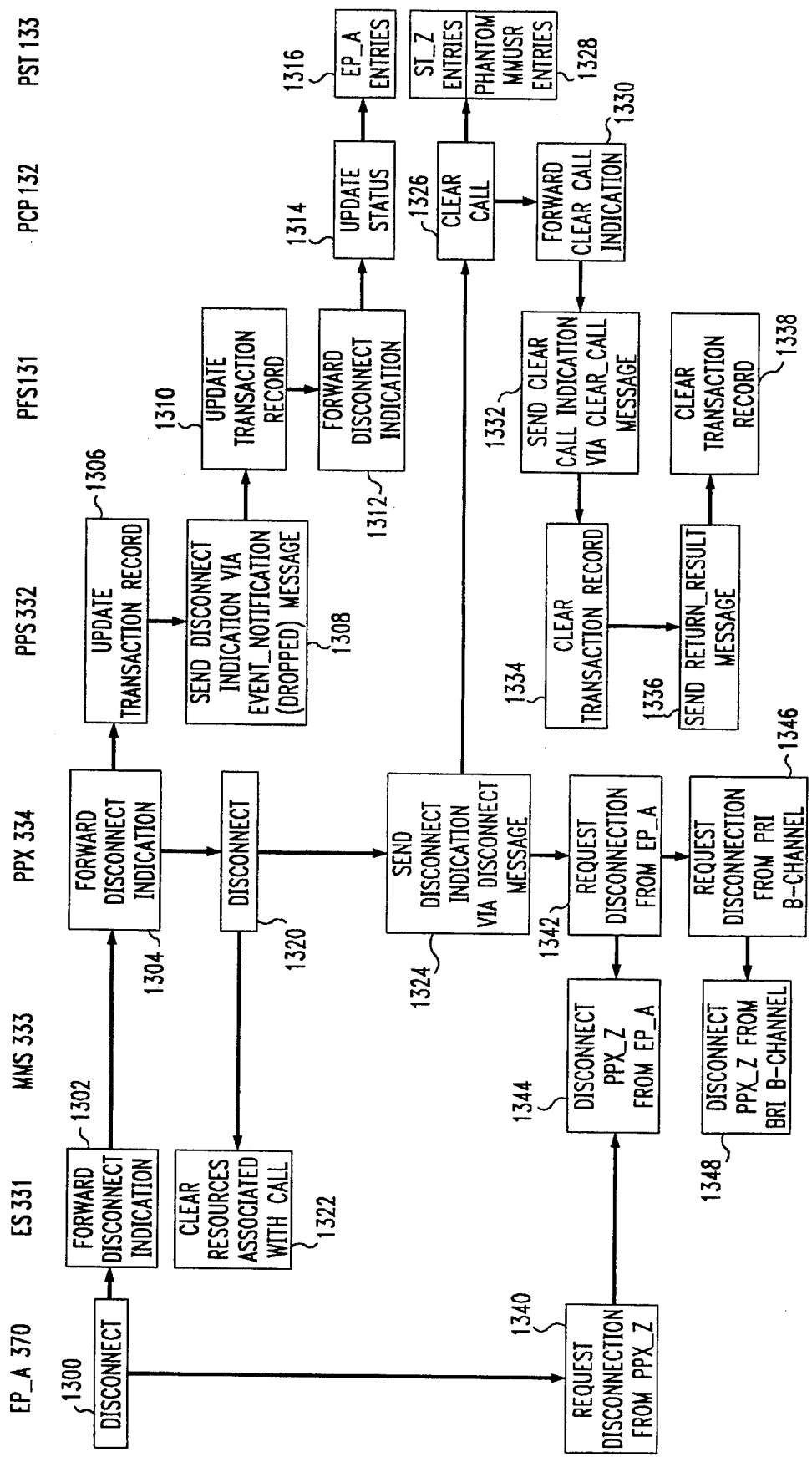
FIG. 13 is a flow diagram of functions performed by the control processes of FIG. 2 to terminate the call of FIGS. 10–12.

FIG. 9 illustrates the scenario for termination of the call between workstation 37 and telephone set 19 whose establishment was illustrated in FIGS. 3 and 7–8. Assume that telephone set 19 is the first to disconnect from the call (disconnection initiated by a workstation is shown in FIG. 13). PCP 132 detects the disconnection in a conventional manner, at step 900. In response, PCP 132 gives an indication of the disconnection by sending a DISCONNECT message over PRI link 10 to PPX_Z, at step 902. PCP 132 also updates the status of endpoints involved in the call, at step 904. This includes changing the status of telephone 19 (ST_Z) in entries 134 of PST 133, as indicated at step 906.

PPX_Z receives the DISCONNECT message from PCP 132 and forwards the disconnect indication to ES 331, at step 908. PPX_Z also requests MMS 333 to disconnect it from workstation 37 (EP_A), at step 918, and to disconnect it from the B-channel of PRI link 10, at step 922. ES 331 forwards the disconnect indication to EP_A 370, at step 910. In response, EP_A 370 issues a clear-call directive to ES 331 and to PPS 332, at step 912. EP_A 370 also requests MMS 333 to disconnect it from PPX_Z, at step 914. In response to the disconnect requests received from EP_A 370 and PPX_Z. MMS 333 disconnects EP_A 370 from PPX_Z 334, at step 920, and disconnects PPX_Z 334 from the B-channel of PRI link 10, at step 924. In response to the clear-call directive, ES 331 clears whatever resources were implicated in the call, at step 916, and PPS 332 sends the directive via a CLEAR_CALL message to PFS 131, at step 930. PFS 131 forwards the clear-call directive to PCP 132, at step 932. In response, PCP 132 clears the call, at step 934, and updates the status of endpoints involved in the call, at step 936. This includes changing the status of EP_A 370 and phantom MMUSR in their entries 134 in PST 133, as indicated at step 938.

Further in response to the received clear-call directive, PFS 131 clears its transaction record for the call, at step 940, and sends a RETURN_RESULT message to PPS 332, at step 942. PPS 332 responds by in turn clearing its transaction record for the call, at step 944. PPS 332 then forwards a clear-call notification to EP_A 370, at step 948. EP_A 370 responds by clearing its call record of the call, at step 950, and the call comes to an end.

Figure 10:
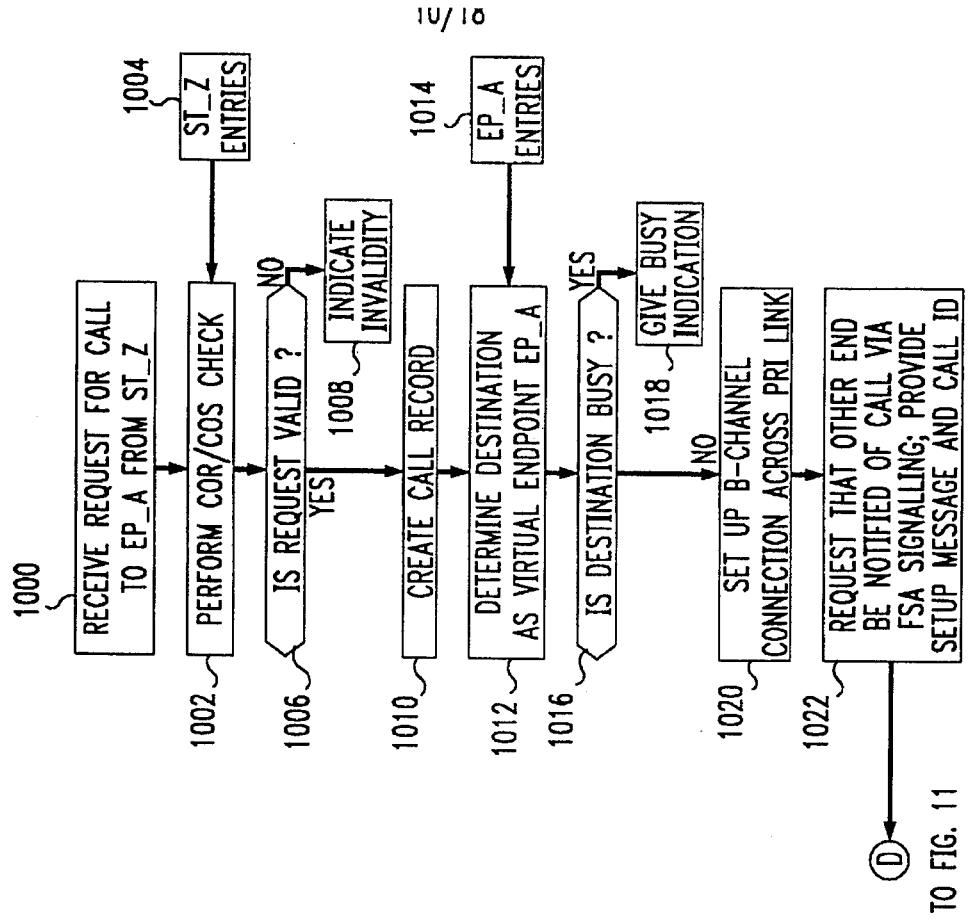
FIGS. 10–12 are a flow diagram of functions performed by the control processes of FIG. 2 to establish a call originated by a telephone set between the telephone set and a workstation in the system of FIG. 1.
Figure 11:
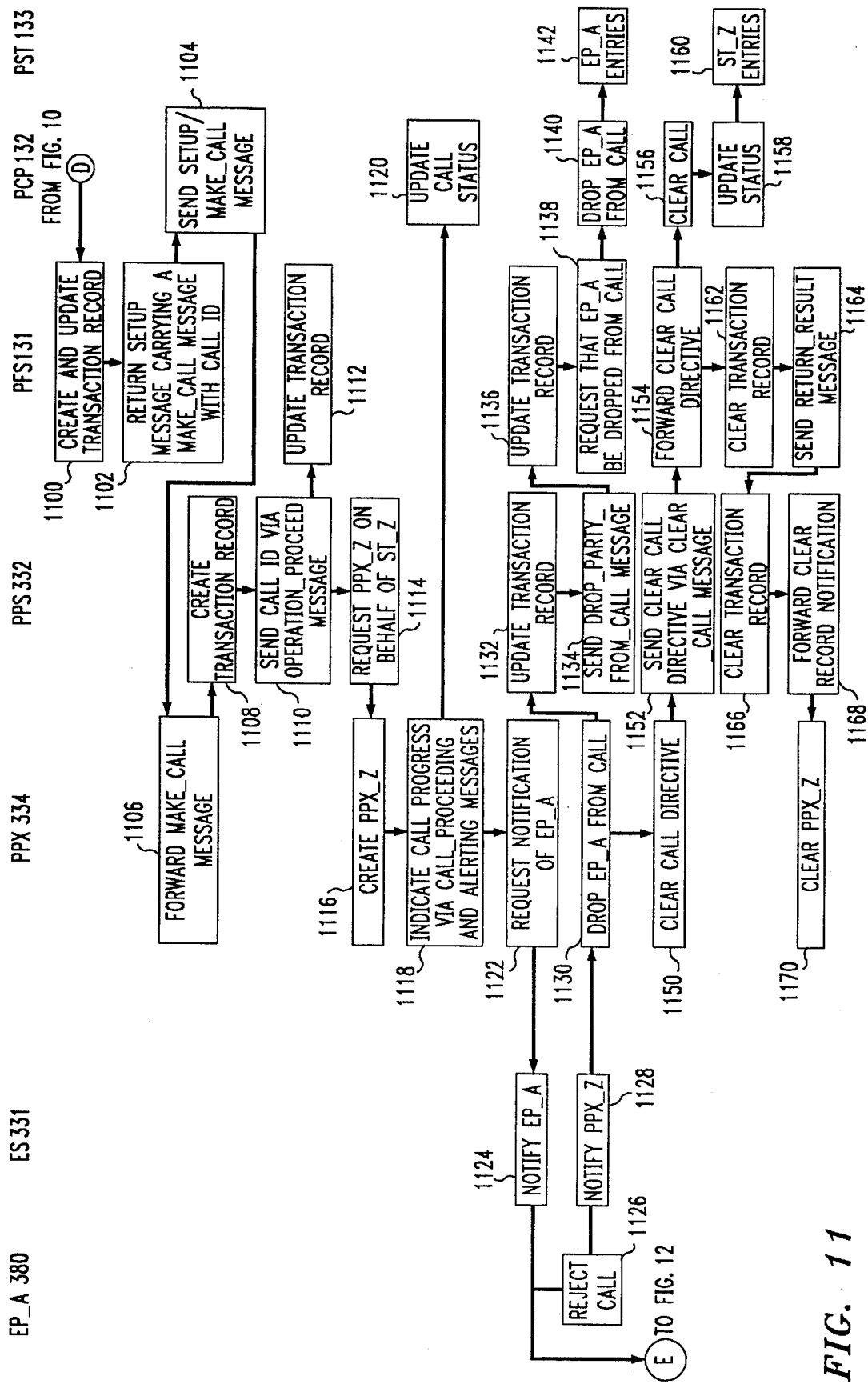
Figure 12:
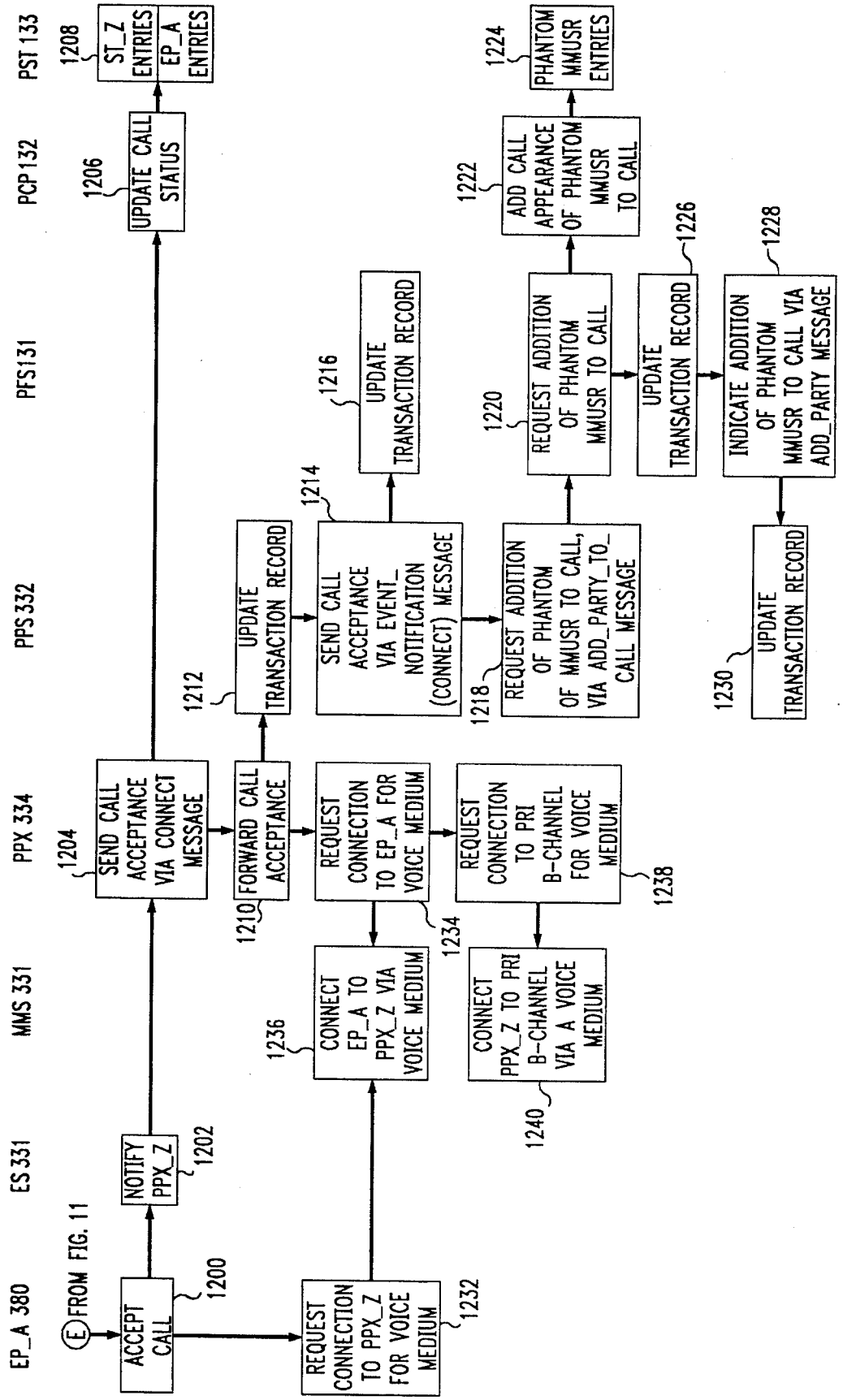

FIGS. 10–12 illustrate a scenario for call establishment between one of the workstations 37–39 and one of the telephone sets 18–19 wherein the call is originated by the telephone set. This call scenario could be the result of either one of the telephone sets 18–19 calling one of the workstations 37–39, or one of the telephone sets 18–19 calling another one of the telephone sets 18–19 but having its call re-directed to one of the workstations 37–39.

Assume that telephone set 19 calls workstation 37 directly. PCP 132 receives a request from telephone set 19 (ST_Z) for a call to workstation 37 (EP_A) in the conventional manner, at step 1000. In response, PCP 132 performs the COR/COS check on the request, at step 1002, by examining entries 134 for telephone set 19 (ST_Z) in PST 133, as indicated at step 1004. If the COR/COS check shows the request to be invalid, as determined at step 1006, PCP 132 indicates invalidity to telephone set 19, at step 1008, and the call comes to an end in the conventional manner. If it is determined at step 1006 that the request is valid, PCP 132 creates a call record for the call, at step 1010, and then determines the destination of the call, at step 1012, from contents of entries 134 of workstation 37 (EP_A) in PST 133, as indicated at step 1014. Assuming that these contents do not change the call destination, PCP 132 determines that the call destination is a virtual endpoint EP_A, and further determines from those contents if the destination is busy, at step 1016. If workstation 37 is indicated in PST 133 to be busy, PCP 132 gives a conventional busy indication to telephone set 19, at step 1018, and the call then comes conventionally to an end. If, however, workstation 37 is not indicated to be busy, PCP 132 sets up a PRI B-channel connection across PRI link 10, at step 1020, in a conventional manner. PCP 132 then requests PFS 131 to notify the other end of PRI link 10 of the existence of the call and provides PFS 131 with a SETUP message and the call identifier that PCP 132 has assigned to the call, at step 1022. The SETUP message conventionally includes identifiers for the call originating and call terminating endpoints. PFS 131 responds to the request by creating a transaction record for the call, in which it enters the endpoint identifiers and both the received call identifier and a call identifier that it assigns to the call, at step 1100 of FIG. 11. PFS 131 also enters in the SETUP message a MAKE_CALL message which contains a call identifier that PFS 131 has assigned to the call, and returns the SETUP message to PCP 132, at step 1102.

PCP 132 sends the SETUP message across PRI link 10 to PPX 334, at step 1104. PPX 334 receives the SETUP message and forwards the MAKE_CALL message contained therein to PPS 332, at step 1106. PPS 332 receives the MAKE_CALL message and creates a transaction record for the call in which it enters both the received call identifier and a call identifier that it assigns to the call, at step 1108. PPS 332 then sends this latter call identifier to PFS 131 via an OPERATION_PROCEED message over PRI link 10, at step 1110. PFS 131 updates its transaction record with the received call identifier, at step 1112.

Further in response to the MAKE_CALL message, PPS 332 requests PPX 334 to create an instance of itself, referred to herein as PPX_Z, on behalf of telephone set 19 (ST_Z), at step 111 4. PPX 334 does so, at step 1116. PPX_Z then reports call progress to PCP 132 by sending a CALL_PROCEEDING message and an ALERTING message across PRI link 10, at step 1118. PCP 132 receives these messages and updates its call status accordingly, at step 1120.

Having reported call progress to PCP 132, PPX_Z also requests ES 331 to notify EP_A 370 and offer it the call from ST_Z, at step 1122. ES 331 does so, at step 1124. The notice indicates that the call is to be conducted in the voice medium.

EP_A 370 can either accept or reject the call. If it rejects the call, it so notifies ES 331, at step 1126. ES 331 in turn notifies PPX_Z, at step 1128. In response, PPX_Z issues a directive to drop EP_A from the call, at step 1130. PPS 332 receives the directive and updates its transaction record accordingly, at step 1132. PPS 332 also sends the directive across PRI link 10 via a DROP_PARTY_FROM_CALL message, at step 1134. PFS 131 receives this message and updates its transaction record accordingly, at step 1136. PFS 131 also requests PCP 132 to drop EP_A from the call, at step 1138. PCP 132 receives the request and drops EP_A from the call, at step 1140, updating its call status accordingly, including modifying entries 134 for EP_A in PST 133, as indicated at step 1160.

It is now up to PPX_Z to decide on behalf of telephone set 19 how to proceed further. The normal course of conduct is to terminate the call attempt and clear the call. Accordingly, PPX_Z issues a clear-call directive, at step 1150. PPS 332 receives the directive and sends it across PRI link 10 via a CLEAR_CALL message, at step 1152. PFS 131 receives this message and forwards the clear-call directive to PCP 132, at step 1154. In response, PCP 132 clears the call, at step 1156, and updates the status of its remaining participant—telephone set 19—in PST 133, at step 1158. This involves modifying entries 134 for ST_Z in PST 133, as indicated at step 1160.

Further in response to receiving the clear-call directive, PFS 131 clears its transaction record for the call, at step 1162, and notifies PPS 332 thereof by sending a RETURN_RESULT message across PRI link 10, at step 1164. PPS 332 receives the message and in turn clears its transaction record for the call, at step 1166. PPS 332 also forwards the clear record notification to PPX_Z, at step 1168. PPX_Z receives the notice and clears itself, thereby ceasing its existence, at step 1170.

Returning to step 1124, assuming that EP_A 370 responds to being offered the call from ST_Z by accepting the call, at step 1200 of FIG. 12, ES 331 receives an indication of the acceptance from EP_A 370 and forwards it to PPX_Z, at step 1202. PPX_Z in turn forwards the acceptance indication to PCP 132 by sending a CONNECT message across PRI link 10, at step 1204. PCP 132 receives the message and updates the status of telephone set 19 and workstation 39 accordingly, at step 1206, by making appropriate changes to the contents of entries 134 for ST_Z and EP_A in PST 133, as indicated at step 1208.

In addition to sending the CONNECT message to PCP 132 at step 1204, PPX_Z also forwards notification of the call acceptance to PPS 332, at step 1210. PPS 332 receives the notification and updates its transaction record accordingly, at step 1212. PPS 332 also sends an indication of the acceptance to PFS 131 via an EVENT_NOTIFICATION (CONNECT) message, at step 1214. PFS 131 receives this message and updates its transaction record accordingly, at step 1216. In addition, PPS 332 requests that phantom MMUSR be added as a party to the call, by sending an ADD_PARTY_TO_CALL message to PFS 131, at step 1218. PFS 131 receives this message and request PCP 132 to add phantom MMUSR to the call, at step 1220. PCP 132 complies, at step 1222. This includes modifying entries 134 for phantom MMUSR in PST 133, as indicated at step 1224.

Having requested PCP 132 to add phantom MMUSR to the call at step 1220, PFS 131 updates its transaction record accordingly, at step 1226. PFS 131 also notifies PPS 332 of the addition of phantom MMUSR to the call by sending an ADD_PARTY message across PRI link 10, at step 1228. PPS 332 receives the message and updates its transaction record accordingly, at step 1230.

Returning to step 1200, having accepted the call, EP_A 370 sends a request to MMS 333 to establish a voice connection from EP_A 370 to PPX_Z, at step 1232. Similarly, PPX_Z requests MMS 333 to establish a voice connection from PPX_Z to EP_A 370, at step 1234. PPX_Z further requests MMS 333 to establish a voice connection from PPX_Z to the PRI B-channel that had been set up by PCP 132 at step 1020 of FIG. 10, at step 1238. MMS 333 receives the connection requests from EP_A 370 and PPX_Z and establishes voice connections between EP_A 370 and PPX_Z, at step 1236, and establishes a voice connection between PPX_Z and the PRI B-channel, at step 1240. Workstation 37 and telephone set 19 are now participating in a voice call.

FIG. 13 illustrates the scenario for termination of the call between workstation 37 and telephone set 19 whose establishment was illustrated in FIGS. 10–12. Assume that workstation 37 (EP_A 370) is the first to disconnect from the call (disconnection initiated by a telephone set is shown in FIG. 9). EP_A 370 notifies ES 331 of the disconnection, at step 1300. ES 331 forwards the notification to PPX_Z, at step 1302. PPX_Z in turn forwards the notification to PPS 332, at step 1304. PPS 332 updates its transaction record accordingly, at step 1306. PPS 332 also sends the disconnect notification to PFS 131 via an EVENT_NOTIFICATION (DROPPED) message, at step 1308. PFS 131 receives this message and updates its transaction record accordingly, at step 1310. PFS 131 also forwards the disconnect indication to PCP 132, at step 1312. In response, PCP 132 updates the status for the call, at step 1314, including modifying entries 134 for EP_A in PST 133, as indicated at step 1316.

Returning to step 1304, having received the disconnect indication from EP_A 370, PPX_Z also undertakes to disconnect from the call and notifies ES 331, at step 1320. In response, ES 331 clears any resources that were implicated in the call, at step 1322. PPX_Z also sends an indication of its disconnection from the call to PCP 132 via a DISCONNECT message, at step 1324. PCP 132 receives the message and responds by clearing the call, at step 1326. This includes updating entries 134 for ST_Z and phantom MMUSR in PST 133, as indicated at step 1328. PCP 132 then gives a clear-call indication to PFS 131, at step 1330. PFS 131 responds by forwarding the clear-call indication to PPS 332 via a CLEAR_CALL message, at step 1332. PPS 332 receives the message and clears its transaction record for the call, at step 1334. It notifies PFS 131 thereof by sending a RETURN_RESULT message across PRI link 10, at step 1336. PFS 131 receives the message and responds by in turn clearing its transaction record for the call, at step 1338.

Returning to steps 1300 and 1324, having undertaken to disconnect from the call, EP_A 370 requests MMS 333 to disconnect it from PPX_Z, at step 1340, and PPX_Z requests MMS 333 to disconnect it from EP_A 370, at step 1342, and from the PRI B channel, at step 1346. MMS 333 receives these disconnection requests and responds by disconnecting PPX_Z and EP_A 370 from each other, at step 1344, and disconnecting PPX_Z and the PRI B-channel from each another, at step 1348.

Figure 14:
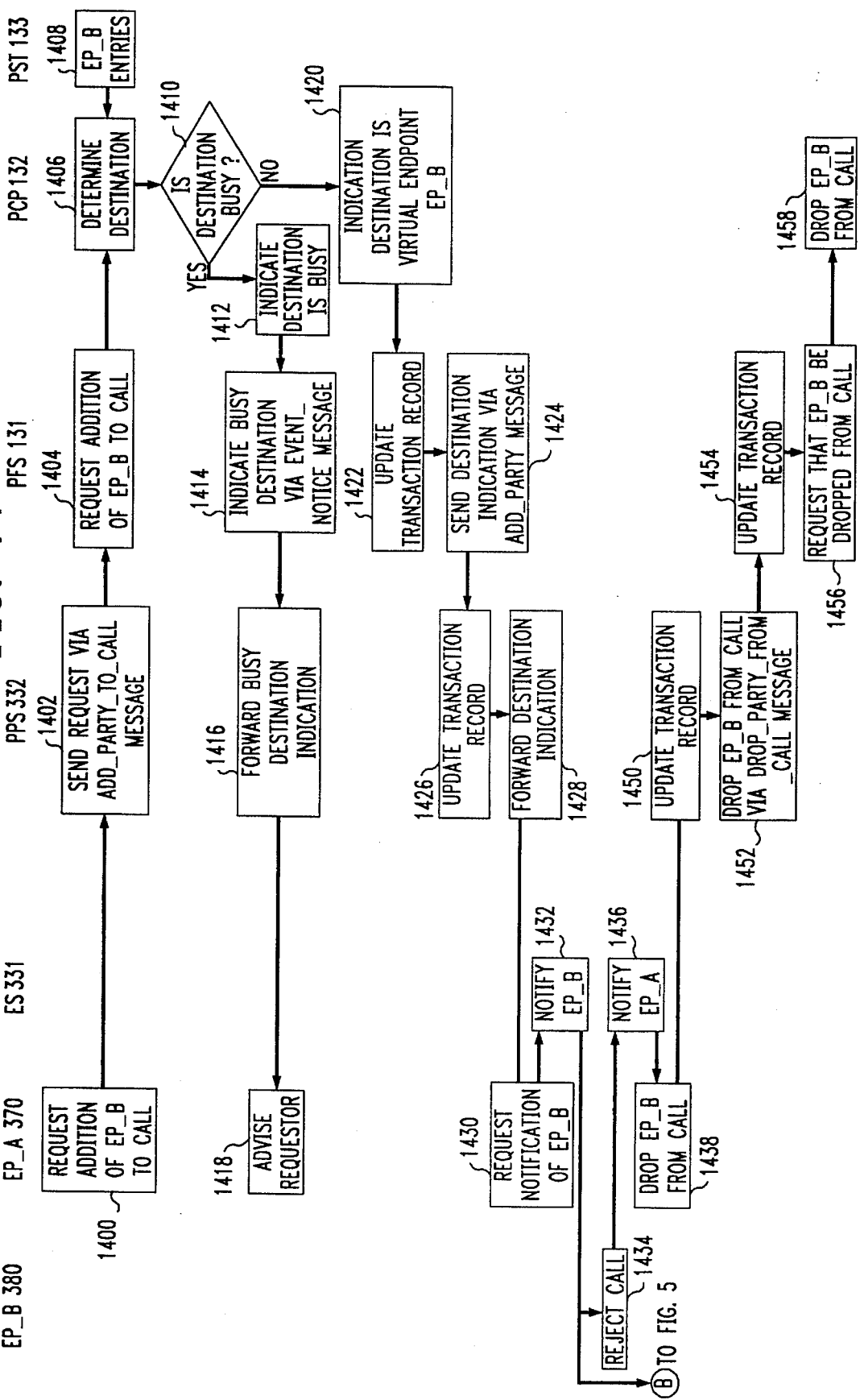

FIGS. 14 and 5 present a first scenario for a conference call. This scenario assumes the existence of a call between workstations -for example, one established according to the scenario of FIGS. 3–5—to which another workstation is being added as a conferee. After establishment of the interworkstation call, assume that EP_A 370 makes a request to add workstation 38 (EP_B) as a conferee to the call, at step 1400. PPS 332 receives the request and sends it across PRI link 10 via an ADD_PARTY_TO_CALL message, at step 1402. PFS 131 receives this message and in response requests addition of EP_B to the call, at step 1404. PCP 132 receives this request and determines—assuming no redirection—that the additional destination for the call is workstation 38, which is a virtual endpoint from the perspective of PBX 13, at step 1406, from contents of entries 134 for workstation 38 (EP_B) in PST 133, as indicated at step 1408. It also determines whether or not workstation 38 is busy, at step 1410. If workstation 38 is busy, the scenario proceeds at steps 1412–1418 which duplicate the steps 406–412 of FIG. 4, discussed above. If EP_B is not busy, PCP 132 notifies PFS 131 of the destination, at step 1420. PFS 131 receives the destination indication and updates its transaction record accordingly, at step 1422. PFS 131 also sends the destination indication across PRI link 10 via an ADD_PARTY message, at step 1424. PPS 332 receives the message and updates its transaction record for the call accordingly, at step 1426. The scenario then proceeds at steps 1428 et seq. which duplicate the steps 448 et seq. of FIGS. 4 and 5, discussed above, with all references to EP_C 390 and workstation 39 in FIGS. 4 and 5 being replaced by references to EP_B 380 and workstation 38.

Figure 15:
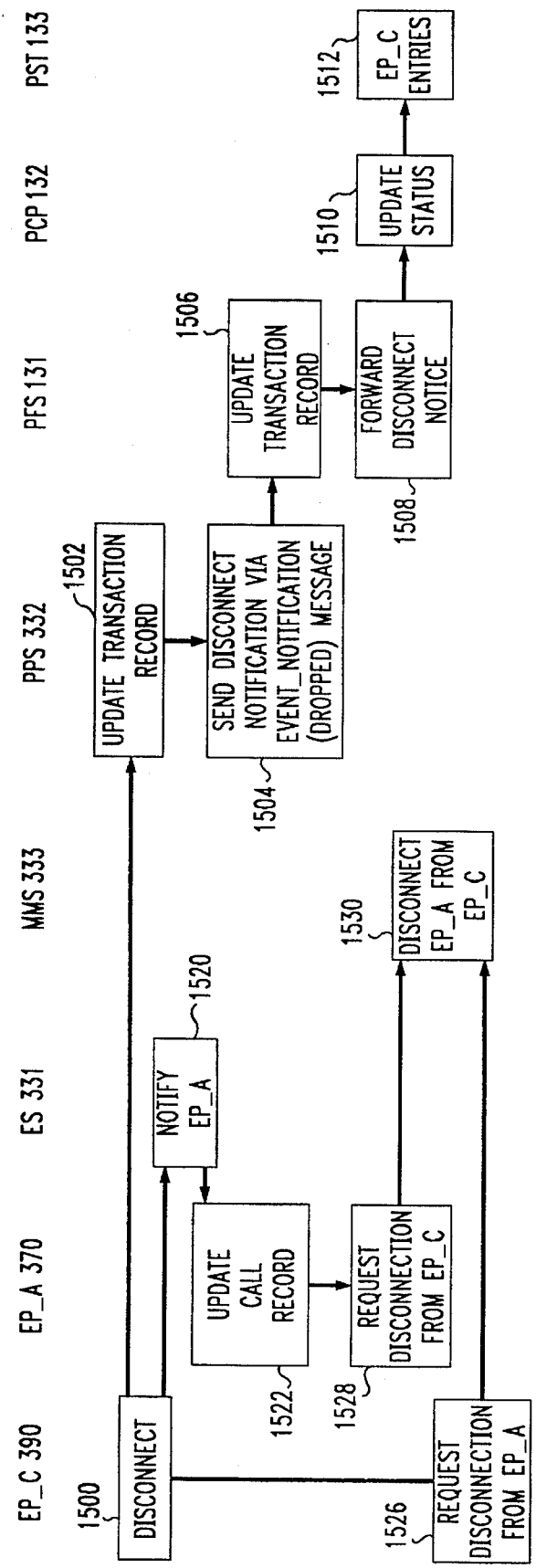
FIG. 15 is a flow diagram of functions performed by the control processes of FIG. 2 to remove a workstation from the conference call of FIGS. 14 and 5.

FIG. 15 shows the disconnect scenario for any but the last two workstations involved in the conference call illustrated in FIG. 14. (The disconnect scenario for the last two workstations is shown in FIG. 6). In FIG. 15, steps 1500–1520 and 1526–1530 duplicate the steps 600–620 and 626–630, respectively, of FIG. 6. In response to being notified of the disconnection of workstation 39 (EP_C) from the call, EP_A 380 does not issue a clear-call directive, but merely updates its call record, at step 1522.

Figure 16:
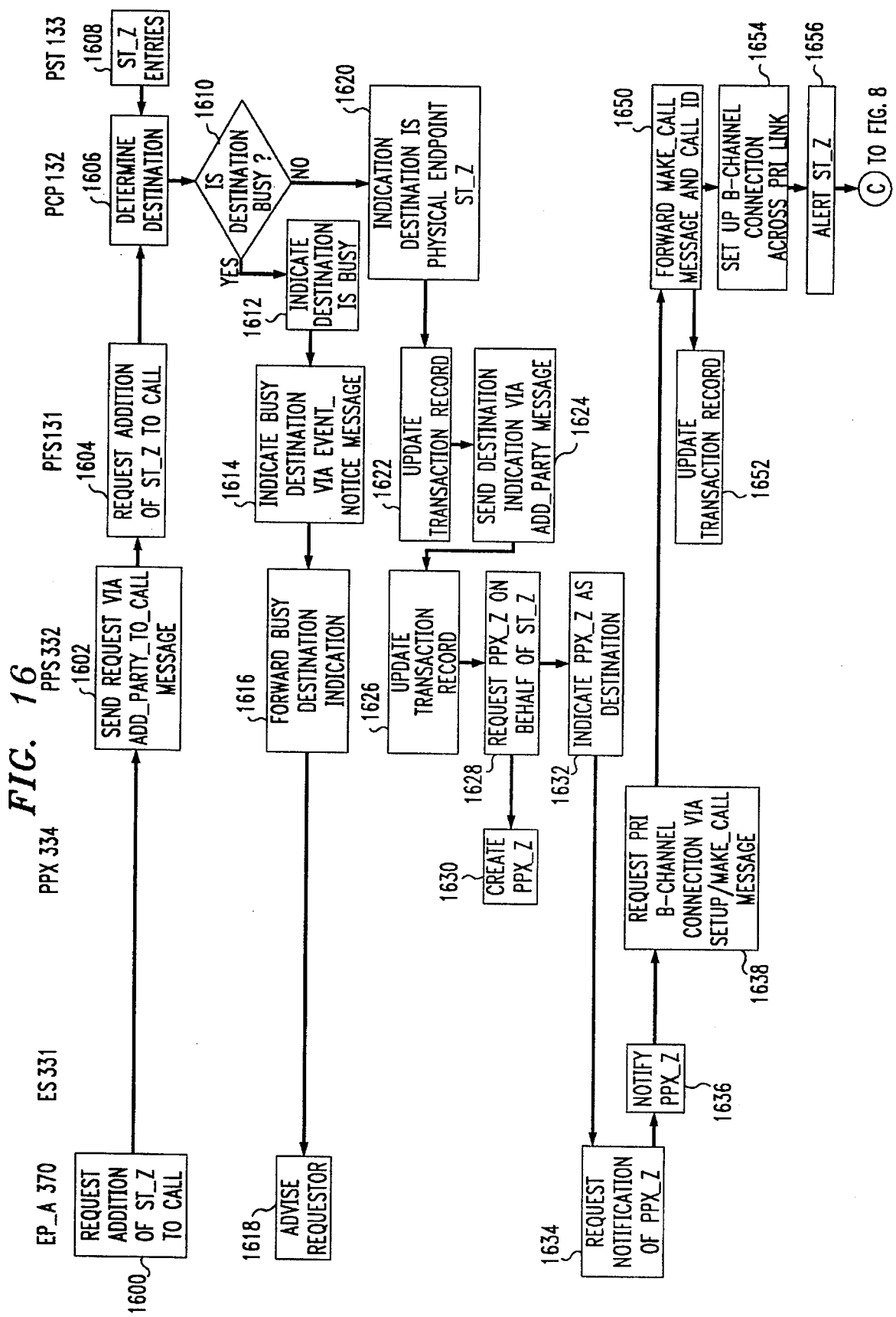

FIGS. 16 and 8 present a second scenario for a conference call. This scenario assumes the existence of a call between workstations—for example, one established according to the scenario of either FIGS. 3–5 or FIGS. 14 and 5—or between a workstation and a first telephone set—for example, one established according to the scenario of either FIGS. 3 and 7–8 or FIGS. 10–12—to which a telephone set 19 is being added as a conferee. After establishment of the inter-workstation call, assume that EP_A 370 make a request to add telephone set 19 (ST_Z) as a conferee to the call, at step 1600. PPS 332 receives the request and sends it across PRI link 10 via an ADD_PARTY_TO_CALL message, at step 1602. PFS 131 receives this message and in response requests addition of ST_Z to the call, at step 1604. PCP 132 receives this request and determines—assuming no redirection—that the additional destination for the call is telephone set 19, which is a physical endpoint, at step 1606, from contents of entries 134 for telephone set 19 (ST_Z) in PST 133, as indicated at step 1608. It also determines whether or not ST_Z is busy, at step 1610. If ST_Z is busy, the scenario proceeds at steps 1612–1618 which duplicate the steps 706–712 of FIG. 7, discussed above. If ST_Z is not busy, PCP 132 notifies PFS 131 of the destination, at step 1620. PFS 131 receives the destination indication and updates its transaction record accordingly, at step 1622. PFS 131 also sends the destination indication across PRI link 10 via an ADD_PARTY message, at step 1624. PPS 332 receives the message and updates its transaction record for the call accordingly, at step 1626. The scenario then proceeds at steps 1628 et seq. which duplicate the steps 740 et seq. of FIGS. 7 and 8, discussed above. In the case of a second telephone set being added as a conferee to a call between a workstation and a first telephone set, this will result in two PRI B channel connections being involved in the conference call.

Figure 17:
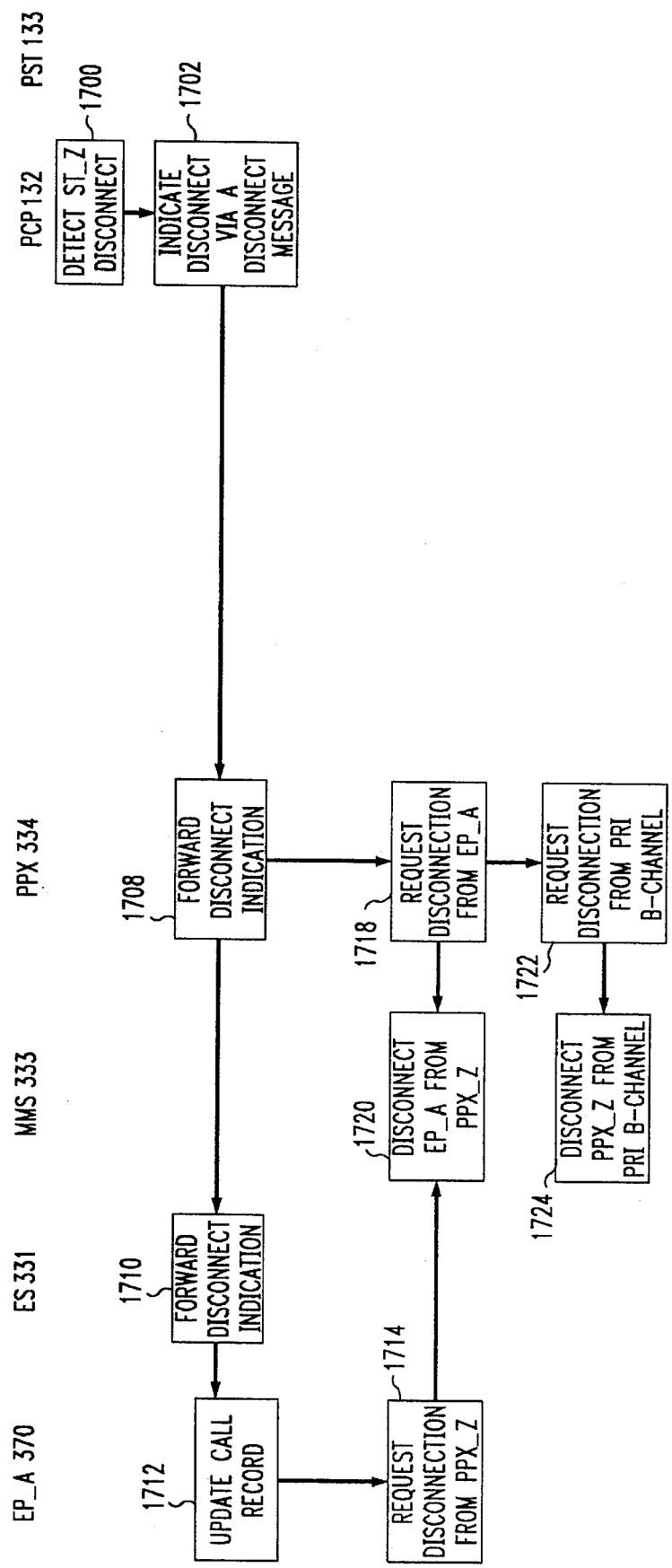
FIG. 17 is a flow diagram of functions performed by the control processes of FIG. 2 to remove a telephone set from the conference call of FIGS. 16 and 8.

The disconnect scenarios for the conference call illustrated in FIG. 16 depend on who disconnects when. If a workstation disconnects while at least two other non-phantom endpoints are engaged in the call, the disconnect scenario for the workstation is the scenario of FIG. 15. If a telephone set disconnects while at least two other non-phantom endpoints are engaged in the call, the disconnect scenario for the telephone is that of FIG. 17. In FIG. 17, steps 1700–1710 and 1714–1724 duplicate the steps 900–910 and 914–1924, respectively, of FIG. 9. In response to being notified of the disconnection of telephone set 19 (ST_Z) from the call, EP_A 370 does not issue a clear-call directive, but merely updates its call record, at step 1712.

For a conference call wherein a workstation 37–39 is being added to an existing call between telephone sets 18–19, the scenario is identical to that for setting up a call initiated by a telephone set to a workstation, illustrated in FIGS. 10–12. The disconnect scenarios for this conference call also depend on who disconnects when as in the case of the conference call illustrated in FIG. 16.

For a conference call wherein a first telephone set conferences in a second telephone set to a call involving the first telephone set and a workstation, the scenario is the conventional conferencing scenario for endpoints served by a PBX 13; there is no involvement of subsystem 11 in setting up the conference. The disconnect scenarios are the same as for the conference call illustrated in FIG. 16.

For a conference call wherein a first workstation conferences in a second workstation to a call involving the first workstation and a telephone set, the scenario is the one illustrated in FIGS. 14 and 5. The disconnect scenarios are the same as for the conference call illustrated in FIG. 16.

Figure 18:
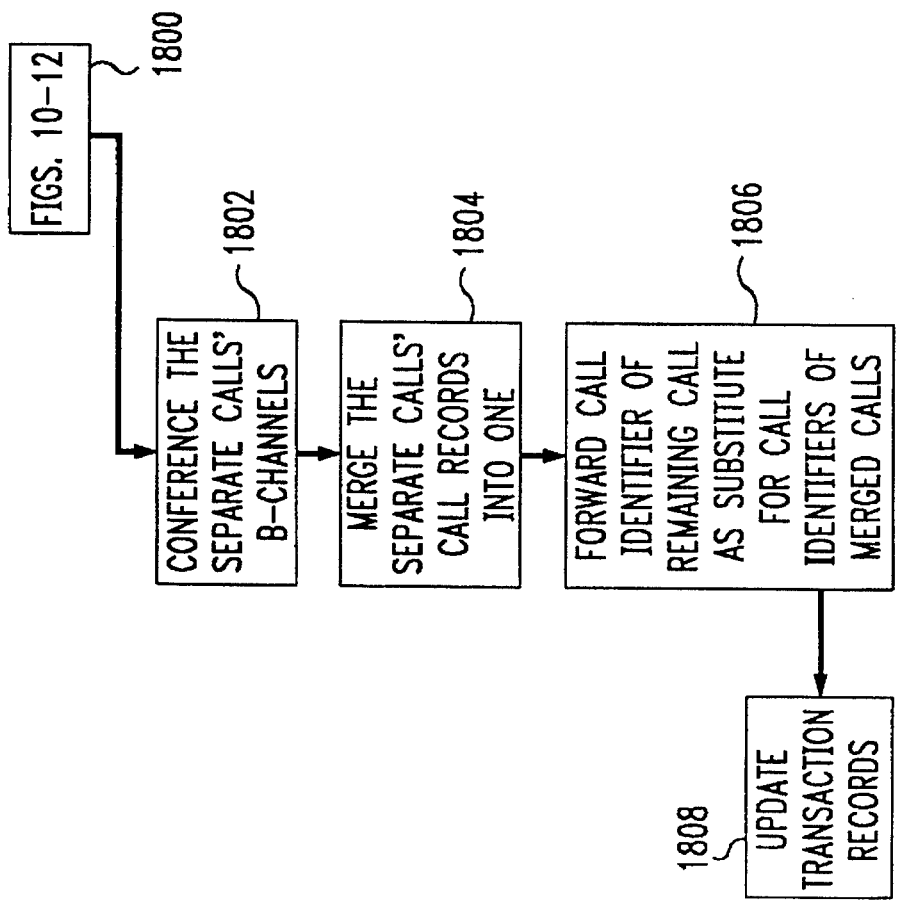
FIG. 18 is a flow diagram of functions performed by the control processes of FIG. 2 to add a telephone set as a conferee to a call between a workstation and a telephone set at the telephone set's request.

For a conference call wherein a telephone set conferences in a second workstation to a call involving the telephone set and a first workstation, one scenario treats the addition of the second workstation as setting up a separate call between the telephone set and the second workstation, as illustrated in FIGS. 10–12, followed by the steps shown in FIG. 18. After the separate calls have been established according to the scenario of FIGS. 10–12, at step 1800, PCP 132 conferences the calls' B channels, at step 1802, in a conventional manner by means of a conference bridge that constitutes a part of the PBX switching fabric 16. PCP 132 also merges the separate call's call records into one, at step 1804, and forwards to PFS 131 the call identifier of the call whose call record remains, as a substitute for the call identifiers of the call or calls whose call records were merged out, at step 1806. PFS 131 updates its transaction records accordingly, at step 1808, resulting in more than one PFS transaction record corresponding to the remaining one (conference) call.

An alternative scenario eliminates the use of multiple B channels for the conference call by eliminating step 1020 in FIG. 10 when the second workstation is being added, and instead having PCP 132 reuse the B channel that was set up for the initial call between the telephone set and the workstation. However, this saving is accomplished at the price of requiring a modification to the conventional PCP 132 that causes it to recognize and handle this type of conference calls differently from conventional calls. The like alternative, with the like penalty, may be used to avoid the use of two B channels for a conference call involving two telephone sets and a workstation, shown in FIG. 16.

The disconnect scenarios are the same as for the conference call illustrated in FIG. 16.

Of course, various changes, modifications, and extensions to the illustrative embodiment described above will be apparent to those skilled in the art. For example, transfer and coverage features are implemented as ADD_PARTY_TO_CALL and DROP_PARTY_FROM_CALL procedures. Such changes and modifications can be made without departing from the spirit and the scope of the invention and without diminishing its attendant advantages. It is therefore intended that such changes and modifications be covered by the following claims.

We claim:

1. A telecommunications system comprising:

a first telecommunications controller providing both basic and other telecommunications connections between a plurality of first telecommunications endpoints;

a second telecommunications controller connected to the first telecommunications controller, providing the basic but not the other telecommunications connections between a plurality of second telecommunications endpoints independently of the first telecommunications controller, and further providing telecommunications features to both (a) the plurality of first telecommunications endpoints through the first telecommunications controller and for both the basic and the other telecommunications connections, and (b) the plurality of second telecommunications endpoints independently of the first telecommunications controller and for the basic telecommunications connections; and the first and the second telecommunications controllers cooperating to provide the basic telecommunications connections between the first telecommunications endpoints and the second telecommunications endpoints.

2. The telecommunications system of claim 1 wherein:

the second telecommunications controller operates as a telecommunications feature server for the first telecommunications controller.

3. The telecommunications system of claim 1 wherein:

the first telecommunications controller responds to features being provided by the second telecommunications controller to the first telecommunications endpoints, by providing both the basic and the other telecommunications connections that implement the provided features to the first telecommunications endpoints.

4. The telecommunications system of claim 1 wherein:

the first telecommunications controller provides features to the first communications endpoints, other than the telecommunications features that are provided to the first telecommunications endpoints by the second telecommunications controller, independently of the second telecommunications controller.

5. The telecommunications system of claim 1 wherein:

the second telecommunications controller is a telephone switching system, the basic telecommunications connections are voice connections, the first telecommunications endpoints are telephones, and the telecommunications features are telephony features.

6. The telecommunications system of claim 1 further comprising:

first means in the first telecommunications controller for receiving a request from a first telecommunications endpoint for a telecommunications connection;

second means in the first telecommunications controller cooperative with the first means, for sending the received request to the second telecommunications controller;

third means in the second telecommunications controller responsive to receipt of the request sent by the second means, for processing the request according to the features being provided by the second telecommunications controller to the first telecommunications endpoints to determine a telecommunications connection that is to be established in response to the request;

fourth means in the second telecommunications controller cooperative with the third means, for sending to the first telecommunications controller an indication of the telecommunications connection that is to be established in response to the request;

fifth means in the first telecommunications controller responsive to receipt of the indication, for establishing the indicated telecommunications connection.

7. The telecommunications system of claim 6 wherein:

the request is for a telecommunications connection between a pair of endpoints, and the third means process the request according to the features being provided by the second telecommunications controller to the pair of endpoints.

8. The telecommunications system of claim 6 wherein:

the request specifies at least one of the basic and the other telecommunications connections as a requested telecommunications connection, and the fifth means establish the requested the telecommunications connection.

9. The telecommunications system of claim 6 wherein:

the fifth means determine at least one of the basic and the other telecommunications connections to be a requested telecommunications connection to be established in response to the request, and respond to receipt of the indication by establishing the indicated telecommunications connection as the determined telecommunications connection.

10. The telecommunications system of claim 1 wherein:

basic telecommunications connections include narrow-band connections, and the other telecommunications connections include broad-band connections.

11. The telecommunications system of claim 10 wherein:

the narrow-band connections include voice connections, and the broad-band connections include data connections, and video or image connections.

12. The telecommunications system of claim 11 wherein:

the telecommunications features are voice telephony features.

13. The telecommunications system of claim 1 wherein:

the second telecommunications controller includes a database indicating, for each first and second telecommunications endpoint, the features being provided to said each first and second telecommunications endpoint.

14. The telecommunications system of claim 13 wherein:

the database further indicates, for each first and second telecommunications endpoint, the present communications status of said each first and second telecommunications endpoint.

15. A telecommunications system comprising:

a telecommunications controller providing both voice and other telecommunications connections between a plurality of telecommunications endpoints;

a telephone switching system connected to the telecommunications controller, providing telephone connections but not the other telecommunications connections between a plurality of telephone sets independently of the telecommunications controller, and further providing telephony features to both (a) the telephone sets, for the telephone connections, independently of the telecommunications controller, and (b) the telecommunications endpoints, for both the voice and the other telecommunications connections, through the telecommunications controller.

16. The telecommunications system of claim 15 wherein:

the telecommunications controller and the telephone switching system cooperate to provide voice connections between the telecommunications endpoints and the telephone sets.

17. The telecommunications system of claim 15 wherein:

the telephone switching system includes, and operates under control of, a stored-program controller; and the stored-program controller is connected to the telecommunications controller and operates as a telephony feature server for the telecommunications controller.

18. A telecommunications system comprising:

a first stored-program-controlled telephone switching system and a second stored-program-controlled telephone switching system connected to each other and each including, and operating under control of, its own stored-program controller;

the first telephone switching system providing telecommunications connections independently of the second telephone switching system between a plurality of first telephone sets that are connected to the first telephone switching system, and further providing telecommunications features to the plurality of first telephone sets;

the second telephone switching system providing telecommunications connections independently of the first telephone switching system between a plurality of second telephone sets that are connected to the second telephone switching system, and further providing telecommunications features to the plurality of second telephone sets; and the first telephone switching system and the second telephone switching system cooperating to provide telecommunications connections between a first telephone set of the plurality of first telephone sets and a second telephone set of the plurality of second telephone sets, with the stored-program controller of one of the first telephone switching system and the second telephone switching system acting as a telecommunications feature server for the stored-program controller of the other of the first telephone switching system and the second telephone switching system to provide the telecommunications features for both the first telephone set and the second telephone set, to effect telecommunications feature transparency between the first telephone switching system and the second telephone switching system for the connection between the first telephone set and the second telephone set.

19. The telecommunications system of claim 17 wherein:

the first telephone switching system provides the telecommunications features for the connections between telephone sets of only the plurality of first telephone sets independently of the second telephone switching system; and the second telephone switching system provides the telecommunications features for the connections between telephone sets of only the plurality of second telephone sets independently of the first telephone switching system.

* * * * *